United States Patent
Tomida et al.

(10) Patent No.: US 8,414,090 B2
(45) Date of Patent: Apr. 9, 2013

(54) ASSISTANCE-LIMIT RECOGNIZING DEVICE, ASSISTANCE-LIMIT RECOGNIZING METHOD, AND VEHICLE BRAKE SYSTEM INCLUDING THE ASSISTANCE-LIMIT RECOGNIZING DEVICE

(75) Inventors: Koichi Tomida, Toyota (JP); Tomohiro Kato, Toyohashi (JP)

(73) Assignees: Toyota Jidosha Kabushiki Kaisha, Toyota-shi (JP); Advics Co., Ltd., Kariya-shi (JP)

( * ) Notice: Subject to any disclaimer, the term of this patent is extended or adjusted under 35 U.S.C. 154(b) by 0 days.

(21) Appl. No.: 13/319,469
(22) PCT Filed: Nov. 19, 2010
(86) PCT No.: PCT/JP2010/071203
§ 371 (c)(1),
(2), (4) Date: Nov. 8, 2011
(87) PCT Pub. No.: WO2011/065515
PCT Pub. Date: Jun. 3, 2011

(65) Prior Publication Data
US 2012/0049615 A1 Mar. 1, 2012

(30) Foreign Application Priority Data
Nov. 30, 2009 (JP) ................................ 2009-272084

(51) Int. Cl.
B60T 8/44 (2006.01)
(52) U.S. Cl. ..................................... 303/114.3; 303/191
(58) Field of Classification Search ............... 303/114.3, 303/115.2, 12, 191
See application file for complete search history.

(56) References Cited

U.S. PATENT DOCUMENTS
4,107,926 A 8/1978 Adachi
5,842,751 A 12/1998 Unterforsthuber
(Continued)

FOREIGN PATENT DOCUMENTS
EP 0 850 815 7/1998
JP 10 236294 9/1998
(Continued)

OTHER PUBLICATIONS
International Search Report Issued Mar. 25, 2011 in PCT/JP10/071203 Filed Nov. 19, 2010.

Primary Examiner — Bradley King
(74) Attorney, Agent, or Firm — Oblon, Spivak, McClelland, Maier & Neustadt, L.L.P.

(57) ABSTRACT

An assistance-limit recognizing device for recognizing a limit of assistance made by a vacuum booster that is configured to assist an operating force applied to a brake operating member. A communication between a variable pressure chamber and a negative pressure chamber of the vacuum booster is established, when the operating force is not applied to the brake operating member. A communication between the variable pressure chamber and the atmosphere is established while the communication between the variable pressure chamber and the negative pressure chamber is cut off, when the operating force is applied to the brake operating member, whereby the operating force applied to the brake operating member is assisted based on a pressure difference between a pressure in the negative pressure chamber and a pressure in the variable pressure chamber. The assistance-limit recognizing device is configured, upon reduction of the variable-pressure chamber pressure in process of change of the variable-pressure chamber pressure toward the atmospheric pressure with application of the operating force to the brake operating member, to recognize the limit of the assistance made by the vacuum booster.

13 Claims, 12 Drawing Sheets

U.S. PATENT DOCUMENTS

| | | | |
|---|---|---|---|
| 5,938,297 A * | 8/1999 | Whaite et al. | 303/114.3 |
| 5,967,628 A | 10/1999 | Abe et al. | |
| 6,033,038 A * | 3/2000 | Kulkarni et al. | 303/114.3 |
| 6,364,429 B1 * | 4/2002 | Roden et al. | 303/114.3 |
| 6,739,676 B1 * | 5/2004 | Isono et al. | 303/114.3 |
| 7,040,719 B2 * | 5/2006 | Collins et al. | 303/114.3 |
| 8,038,228 B2 * | 10/2011 | Gronau et al. | 303/114.3 |
| 2004/0160119 A1 | 8/2004 | Wagner et al. | |
| 2009/0024291 A1 | 1/2009 | Masuda et al. | |

FOREIGN PATENT DOCUMENTS

| | | |
|---|---|---|
| JP | 2001 080497 | 3/2001 |
| JP | 2001 171511 | 6/2001 |
| WO | 02 098718 | 12/2002 |

* cited by examiner

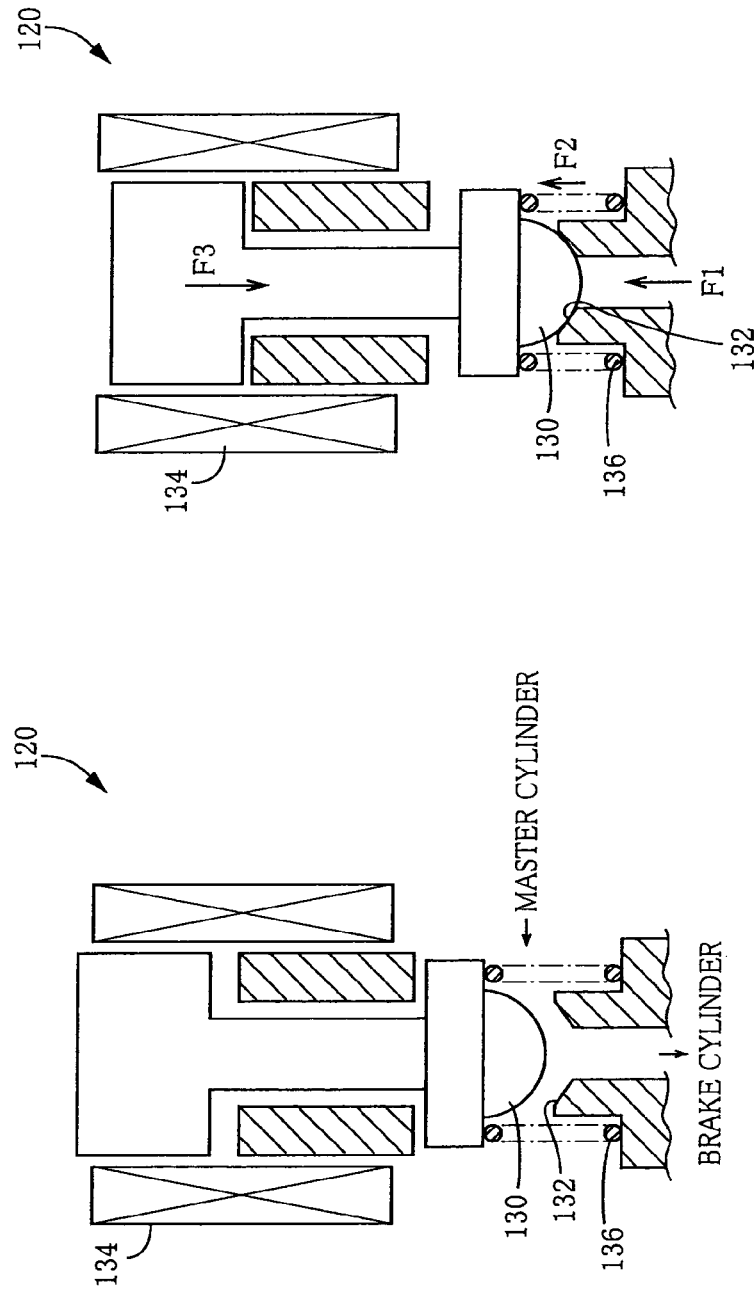

ASSISTANCE-LIMIT RECOGNIZING DEVICE, ASSISTANCE-LIMIT RECOGNIZING METHOD, AND VEHICLE BRAKE SYSTEM INCLUDING THE ASSISTANCE-LIMIT RECOGNIZING DEVICE

This application is based on Japanese Patent Application No. 2009-272084 filed on Nov. 30, 2009, the content of which is incorporated hereinto by reference.

TECHNICAL FIELD

The present invention relates to a device and a method of detecting or recognizing a limit of assistance by a vacuum booster, and also a vehicle brake system including the device.

BACKGROUND ART

In each of most vehicles, there is provided a vacuum booster for assisting an operating force that is to be applied to a brake operating member of the vehicle. It is common that the vacuum booster has a negative pressure chamber and a variable pressure chamber that is to be selectively brought into communication with the negative pressure chamber and the atmosphere, such that a communication between the variable pressure chamber and the negative pressure chamber is established when the operating force is not being applied to the brake operating member from an operator of the vehicle, and such that a communication between the variable pressure chamber and the atmosphere is established while the communication between the variable pressure chamber and the negative pressure is being cut off, when the operating force is being applied to the brake operating member, whereby the operating force applied to the brake operating member is assisted by an assisting force generated based on a difference between a pressure in the negative pressure chamber and a pressure in the variable pressure chamber. In this arrangement, the assisting force generated by the vacuum booster and assisting the operating force is increased as long as the difference is being increased. However, when the difference becomes not to be increased, the assisting force becomes not to be increased so that a limit of the assistance made by the vacuum booster is reached. When the limit of the assistance is thus reached, the assisting force is not increased whereby a discomfort could be given to a vehicle operator who operates the brake operating member. Patent literatures identified below disclose techniques each relating to a device capable of recognizing a limit of assistance made by the vacuum booster so as to monitor whether the assistance limit has been reached or not.

PRIOR ART LITERATURES

Patent Literatures

[Patent Literature 1] JP-2001-80497A
[Patent Literature 2] JP-2001-171511A
[Patent Literature 3] JP-H10-236294A

DISCLOSURE OF THE INVENTION

The assisting force generated by the vacuum booster is increased with increase of a difference between a variable-pressure chamber pressure (i.e., air pressure within the variable pressure chamber) and a negative-pressure chamber pressure (i.e., air pressure within the negative pressure chamber), as described above. However, when the variable-pressure chamber pressure becomes equal to an atmospheric pressure, a difference between the variable-pressure chamber pressure and the negative-pressure chamber pressure becomes substantially constant since the negative-pressure chamber pressure is kept substantially constant, so that the assisting force becomes not to be increased. In the light of this finding, the above-identified Patent Literature 3 discloses an assistance-limit recognizing device configured to recognize the limit of assistance by the vacuum booster when the variable-pressure chamber pressure becomes equal to the atmospheric pressure. It is fact that the assistance limit is reached when the difference between the variable-pressure chamber pressure and the negative-pressure chamber pressure becomes constant. However, it is also fact that there is a case where the difference between the variable-pressure chamber pressure and the negative-pressure chamber pressure is made small in process of inflow of the atmosphere into the variable pressure chamber before the variable-pressure chamber pressure becomes equal to the atmospheric pressure, for example, in the event of an abrupt braking operation. In such a case, a boosting effect provided by the vacuum booster is reduced even before the variable-pressure chamber pressure becomes equal to the atmospheric pressure. Accordingly, there is a case where it is preferable to regard that the assistance limit has been reached before the variable-pressure chamber pressure becomes equal to the atmospheric pressure. The present invention was made in view of such a background. It is therefore a first object of the invention to provide a device and a method of making it possible to detect or recognize the assistance limit before the variable-pressure chamber pressure becomes equal to the atmospheric pressure.

Further, when the assistance limit is recognized, it is desirable to cause the brake force to be increased by, for example, a device other than the vacuum booster, so as not to give the vehicle operator a discomfort due to reduction of the boosting effect. However, in an arrangement where the assistance limit is recognized at a point of time at which the variable-pressure chamber pressure becomes equal to the atmospheric pressure, there is a risk that a discomfort could be given to the vehicle operator who operates the brake operating member if the boosting effect is reduced before the variable-pressure chamber pressure becomes equal to the atmospheric pressure. This is because, in this arrangement, the reduction of the boosting effect before the variable-pressure chamber pressure becomes equal to the atmospheric pressure, leads to failure of increase of the brake force by the device other than the vacuum booster, at a suitable point of time. The present invention was made also in view of such a background. It is therefore a second object of the invention to provide a vehicle brake system in which the vehicle operator can perform a braking operation without feeling discomfort even if the boosting effect is reduced before the variable-pressure chamber pressure becomes equal to the atmospheric pressure.

The first object may be achieved according to a first aspect of the invention, which provides an assistance-limit recognizing device and an assistance-limit recognizing method that are configured, upon reduction of the variable-pressure chamber pressure in process of change of the variable-pressure chamber pressure to the atmospheric pressure with application of the operating force to the brake operating member, to recognize the limit of the assistance by the vacuum booster. Further, the second object may be achieved according to a second aspect of the invention, which provides a vehicle brake system configured, when the limit of the assistance is recognized by the assistance-limit recognizing device, to cause the brake force to be increased by a device other than the vacuum booster.

After start of the braking operation, the variable-pressure chamber pressure is increased by inflow of the atmosphere into the variable pressure chamber, and normally the increase of the variable-pressure chamber pressure continues until the variable-pressure chamber pressure becomes equal to the atmospheric pressure. However, in the event of an abrupt braking operation, for example, there is a case where the variable-pressure chamber pressure is reduced before the variable-pressure chamber pressure becomes equal to the atmospheric pressure. In such an event, the assisting force generated by the vacuum booster is reduced by reduction of difference between the variable-pressure chamber pressure and the negative-pressure chamber pressure, whereby the boosting effect is reduced. In the assistance-limit recognizing device and assistance-limit recognizing method according to the first aspect of the invention, it is possible to recognize the assistance limit before the variable-pressure chamber pressure becomes equal to the atmospheric pressure. In the vehicle brake system according to the second aspect of the invention, when the assistance limit is recognized by the above-described assistance-limit recognizing device, a fluid pressure of a working fluid acting on a brake device can be increased by, for example, activation of a working-fluid pressurizing device, so as to be made higher than a fluid pressure of the working fluid pressurized by the master cylinder. Therefore, in the brake system according to the second aspect of the invention, the vehicle operator can perform the brake operation without any discomfort even when the boosting effect is reduced before the variable-pressure chamber pressure becomes equal to the atmospheric pressure.

VARIOUS MODES OF THE INVENTION

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein. It is noted modes (1)-(9) and (11) correspond to claims 1-10, respectively.

(1) An assistance-limit recognizing device for recognizing a limit of assistance made by a vacuum booster that is configured to assist an operating force applied to a brake operating member of a vehicle from an operator of the vehicle, the vacuum booster having a negative pressure chamber and a variable pressure chamber that is to be selectively brought into communication with the negative pressure chamber and an atmosphere, such that a communication between the variable pressure chamber and the negative pressure chamber is established, when the operating force is not being applied to the brake operating member from the operator, and such that a communication between the variable pressure chamber and the atmosphere is established while the communication between the variable pressure chamber and the negative pressure chamber is being cut off, when the operating force is being applied to the brake operating member, whereby the operating force applied to the brake operating member is assisted based on a pressure difference between a pressure in the negative pressure chamber and a pressure in the variable pressure chamber, the assistance-limit recognizing device being configured, upon reduction of the pressure in the variable pressure chamber in process of change of the pressure in the variable pressure chamber toward a pressure of the atmosphere with application of the operating force to the brake operating member, to recognize the limit of the assistance made by the vacuum booster.

In the vacuum booster recited in this mode (1), when the pressure in the variable pressure chamber becomes equal to the atmospheric pressure as a result of inflow of the atmosphere to the variable pressure chamber, a difference between the pressure in the variable pressure chamber and the pressure in the negative pressure chamber becomes substantially constant since the negative-pressure chamber pressure is kept substantially constant, so that the assisting force becomes not to be increased. When the assisting force becomes not to be increased, the boosting effect of the vacuum booster is reduced so that the limit of the assistance made by the vacuum booster is reached. In view of this, there is a study of a device configured to recognize that the assistance limit is reached at a point of time at which the variable-pressure chamber pressure becomes equal to the atmospheric pressure. When the variable-pressure chamber pressure becomes equal to the atmospheric pressure, the assistance limit is actually reached, since the difference between the variable-pressure chamber pressure and the negative-pressure chamber pressure is unlikely to be increased unless the braking operation is stopped. However, for example, in the event of an abrupt braking operation, there is also a case where the boosting effect is reduced in process of inflow of the atmosphere into the variable pressure chamber, i.e., before the variable-pressure chamber pressure becomes equal to the atmospheric pressure. In such a case, it is desirable to regard that the assistance limit is reached before the variable-pressure chamber pressure becomes equal to the atmospheric pressure.

In the light of what is described above, in the assistance-limit recognizing device constructed according to this mode (1), the limit of the assistance by the vacuum booster is recognized when the variable-pressure chamber pressure is reduced in process of change of the variable-pressure chamber pressure toward the atmospheric pressure during the braking operation. During the braking operation, as a result of inflow of the atmosphere into the variable pressure chamber, normally, the variable-pressure chamber pressure is held increased until the variable-pressure chamber pressure becomes equal to the atmospheric pressure. However, for example, in the event of an abrupt braking operation, there is a case where the variable-pressure chamber pressure is reduced before the variable-pressure chamber pressure becomes equal to the atmospheric pressure. In such a case, the difference between the variable-pressure chamber pressure and the negative-pressure chamber pressure is reduced whereby the boosting effect of the vacuum booster is weaken. In the assistance-limit recognizing device constructed according to this mode (1), it is possible to recognize the assistance limit before the variable-pressure chamber pressure becomes equal to the atmospheric pressure.

The assistance-limit recognizing device according to this mode (1) may be configured to recognize the assistance limit at any moment upon reduction of the variable-pressure chamber pressure. For example, the assistance limit may be recognized at a point of time at which the variable-pressure chamber pressure begins to be reduced in process of change of the variable-pressure chamber pressure toward the atmospheric pressure, i.e., at a point of time at which increase of the variable-pressure chamber pressure turns into reduction of the variable-pressure chamber pressure. Further, the assistance limit may be recognized at a point of time at which the variable-pressure chamber pressure is most reduced in process of change of the variable-pressure chamber pressure toward the atmospheric pressure, i.e., at a point of time at which reduction of the variable-pressure chamber pressure turns into increase of the variable-pressure chamber pressure. Still further, the recognition of the assistance limit may be made at anytime between the above-described two points of time.

(2) The assistance-limit recognizing device according to mode (1), being configured to recognize the limit of the assistance made by the vacuum booster, at a point of time when the pressure in the variable pressure chamber is most reduced upon the reduction of the pressure in the variable pressure chamber in the process of change of the pressure in the variable pressure chamber toward the pressure of the atmosphere.

In process of change of the variable-pressure chamber pressure toward the atmospheric pressure during the braking operation, it is considered that the difference between the variable-pressure chamber pressure and the negative-pressure chamber pressure is reduced with reduction of the variable-pressure chamber pressure. Therefore, in the assistance-limit recognizing device constructed according to this mode (2), it is possible to recognize the assistance limit at a point of time at which the boosting effect is reduced by a certain degree.

(3) The assistance-limit recognizing device according to mode (1) or (2), wherein the vacuum booster includes a housing and a diaphragm which divides an inner space within the housing into the negative pressure chamber and the variable pressure chamber, and which is movable with the application of the operating force to the brake operating member, in a manner that causes reduction of a volume of the negative pressure chamber and increase of a volume of the variable pressure chamber.

In the vacuum booster recited in this mode (3), the volume of the variable pressure chamber is increased with reduction of the volume of the negative pressure chamber during the braking operation, and is increased at a velocity that is increased with increase of a velocity of operation of the brake operating member by the vehicle operator. Meanwhile, there is a limit of flow rate at which the atmosphere is caused to flow into the variable pressure chamber. Therefore, in the event of an abrupt braking operation, there is a case where the variable-pressure chamber pressure is reduced, in process of change of the variable-pressure chamber pressure toward the atmospheric pressure as a result of inflow of the atmosphere into the variable-pressure chamber pressure. That is, in the vacuum booster recited in this mode (3), upon execution of the abrupt braking operation, for example, there is a case where the boosting effect is reduced before the variable pressure chamber pressure becomes equal to the atmospheric pressure. Therefore, in the assistance-limit recognizing device according to this mode (3), it is possible to fully enjoy an effect of the recognition of the assistance limit upon reduction of the variable-pressure chamber pressure.

(4) The assistance-limit recognizing device according to any one of modes (1)-(3), wherein the vacuum booster has: (i) an atmosphere inflow passage through which the variable pressure chamber is to be brought into communication with the atmosphere whereby an air is introduced into the variable pressure chamber via the atmosphere inflow passage; and (ii) a filter disposed in the atmosphere inflow passage.

In the vacuum booster recited in this mode (4), the filter is provided in the atmosphere inflow passage, for preventing dust or foreign matters from entering into the variable pressure chamber. That is, the atmosphere is caused to pass through the filter when the atmosphere is to flow into the variable pressure chamber, so that the rate of the inflow of the atmosphere into the variable pressure chamber is made lower than in an arrangement in which the filter is not provided in the atmosphere inflow passage. Therefore, in this vacuum booster in which the filter is provided in the atmosphere inflow passage, there is a case where the boosting effect is reduced before the variable-pressure chamber pressure becomes equal to the atmospheric pressure, for example, in the event of an abrupt braking operation. Therefore, in the assistance-limit recognizing device according to this mode (4), too, it is possible to fully enjoy an effect of the recognition of the assistance limit upon reduction of the variable-pressure chamber pressure.

(5) The assistance-limit recognizing device according to any one of modes (1)-(4), configured, when an amount of operation of the brake operating member is reduced, to abstain from recognizing the limit of the assistance, even upon the reduction of the pressure in the variable pressure chamber in the process of change of the pressure in the variable pressure chamber toward the pressure of the atmosphere.

During a braking operation, as a result of inflow of the atmosphere into the variable pressure chamber, normally, the variable-pressure chamber pressure is held increased until the variable-pressure chamber pressure becomes equal to the atmospheric pressure. However, during the braking operation, there is a case where the vehicle operator temporarily reduces the operating force applied to the brake operating member and then again increases the operating force applied to the brake operating member, namely, where the vehicle operator temporarily releases the brake operating member and then again depresses the brake operating member. In such a case, the variable pressure chamber and the negative pressure chamber could be brought into communication with each other whereby the variable-pressure chamber pressure could be reduced. That is, there is a case where the variable-pressure chamber pressure is reduced even though the assistance limit is not reached. In the assistance-limit recognizing device according to this mode (5), when there is a possibility that the variable pressure chamber is brought into communication with the negative pressure chamber, it is possible to inhibiting or abstain from making recognition of the assistance limit, which is to be made based on reduction of the pressure in the variable pressure chamber, and accordingly it is possible to avoid erroneous recognition of the assistance limit.

In the assistance-limit recognizing device according to this mode (5), there may be provided a judging portion that is configured to make judgment as to whether the amount of operation of the brake operating member has been reduced or not. The judgment may be made based on the operation amount, as such, of the brake operating member. Further, the judgment may be made based on, in addition to or in place of the operation amount of the brake operating member, (i) a value indicative of the operation amount of the brake operating member such as a velocity of operation of the brake operating member, (ii) a pressure of a working fluid (that is to be pressurized based on the operating force applied to the brake operating member and the assisting force generated by the vacuum booster) and (iii) a velocity or rate of change of the pressure of the working fluid.

(6) The assistance-limit recognizing device according to any one of modes (1)-(5), configured, when a velocity of operation of the brake operating member is not higher than a threshold velocity, to abstain from recognizing the limit of the assistance, even upon the reduction of the pressure in the variable pressure chamber in the process of change of the pressure in the variable pressure chamber toward the pressure of the atmosphere.

A phenomenon of reduction of the variable-pressure chamber pressure due to the limit of the assistance by the vacuum booster, mostly, takes place in the event of an abrupt braking operation. That is, expect when an abrupt braking operation is being executed, the assistance limit is not necessarily reached even upon reduction of the variable-pressure chamber pressure. In the assistance-limit recognizing device according to this mode (6), except when an abrupt braking operation is being executed, it is possible to abstain from making recognition of the assistance limit, which is to be made based on reduction of the pressure in the variable pressure chamber, and accordingly it is possible to avoid erroneous recognition of the assistance limit.

In the assistance-limit recognizing device according to this mode (6), there may be provided a judging portion that is configured to make judgment as to whether the operation velocity of the brake operating member is not higher than a threshold velocity. The judgment may be made based on the operation velocity, as such, of the brake operating member. Further, the judgment may be made based on, in addition to or in place of the operation velocity of the brake operating member, a value indicative of the operation velocity of the brake operating member such as a rate of change of a pressure of a working fluid (that is to be pressurized based on the operating force applied to the brake operating member and the assisting force generated by the vacuum booster).

(7) A vehicle brake system comprising:
the assistance-limit recognizing device recited in any one of modes (1)-(6);
the brake operating member;
the vacuum booster;
a master cylinder configured to pressurize a working fluid, based on the operating force applied to the brake operating member and an assisting force generated by the vacuum booster;
a brake device configured to generate a brake force, based on the working fluid pressurized by the master cylinder;
a communication passage through which the working fluid is to flow between the brake device and the master cylinder;
a communication-state switching device disposed in the communication passage, and configured to switch a flowing state of the working fluid between a flow allowing state in which the working fluid is allowed to flow between the brake device and the master cylinder and a flow inhibiting state in which the working fluid is inhibited from flowing between the brake device and the master cylinder;
a working-fluid pressurizing device configured to pressurize the working fluid that is to act on the brake device such that the working fluid is pressurized in a portion of the communication passage which is located between the communication-state switching device and the brake device;
an adjusting device configured to adjust a pressure of the working fluid which is to act on the brake device;
a control device configured to control the communication-state switching device for thereby switching the flowing state of the working fluid, configured to control the working-fluid pressurizing device for thereby selectively activating and inactivating the working-fluid pressurizing device, and configured to control the adjusting device for thereby controlling a brake acting pressure which is the pressure of the working fluid that is to act on the brake device; and the control device being configured, when the limit of the assistance made by the vacuum booster is recognized by the assistance-limit recognizing device, to control the communication-state switching device, the working-fluid pressurizing device and the adjusting device such that the flow of the working fluid between the brake device and the master cylinder is being inhibited and such that the brake acting pressure is higher than a master cylinder pressure which is the pressure of the working fluid which is pressurized by the master cylinder.

When the assistance limit is recognized, it is desirable to cause the brake force to be increased by, for example, a device other than the vacuum booster, so as not to give the vehicle operator a discomfort due to reduction of the boosting effect. However, in an arrangement where the assistance limit is recognized at a point of time at which the variable-pressure chamber pressure becomes equal to the atmospheric pressure, there is a risk that a discomfort could be given to the vehicle operator who operates the brake operating member if the boosting effect is reduced before the variable-pressure chamber pressure becomes equal to the atmospheric pressure. This is because, in this arrangement, the reduction of the boosting effect before the variable-pressure chamber pressure becomes equal to the atmospheric pressure, leads to failure of increase of the brake force by the device other than the vacuum booster, at a suitable point of time. In the vehicle brake system according to this mode (7), the assistance limit is recognizable by the assistance-limit recognizing device, and the brake acting pressure (i.e., the pressure of the working fluid acting on the brake device) can be increased, upon recognition of the assistance limit, by activation of the working-fluid pressurizing device, for example, such that the brake acting pressure is higher than the master cylinder pressure (i.e., the pressure of the working fluid pressurized by the master cylinder). Therefore, in the vehicle brake system according to this mode (7), the vehicle operator can perform a braking operation without feeling discomfort even if the boosting effect is reduced before the variable-pressure chamber pressure becomes equal to the atmospheric pressure.

In the vehicle brake system according to this mode (7), the communication-state switching device and the adjusting device may be constituted by respective two devices that are independent of each other, or may be constituted by a single device having functions of the communication-state switching device and the adjusting device. That is, the vehicle brake system may include two valves one of which serves as the communication-state switching device and the other of which serves as the adjusting device, or may include a single valve having functions of the communication-state switching device and the adjusting device, i.e., a single valve which is configured to switch the flowing state of the working fluid between the flow allowing state and the flow inhibiting state and which is configured to control or adjust the fluid pressure of the working fluid acting on the brake device while the flow inhibiting state is being established. Further, the working-fluid pressurizing device included in the vehicle brake system according to this mode (7) may be configured to pump the working fluid from the reservoir or the like and to pressurize the pumped working fluid, or may be configured to pump the working fluid pressurized by the master cylinder and to pressurize the pumped working fluid. In the latter arrangement in which the working-fluid pressurizing device is configured to pump the fluid pressurized by the master cylinder and to pressurize the pumped working fluid, the working-fluid pressurizing device may be connected to an auxiliary passage that branches off a portion of a communication passage which is located between the master cylinder and the communication-state switching device, so that the working fluid supplied through the auxiliary passage can be pressurized.

(8) The vehicle brake system according to mode (7), wherein the control device is configured, when the limit of the assistance made by the vacuum booster is recognized by the assistance-limit recognizing device, to control the adjusting device such that a difference between the brake acting pressure and the master cylinder pressure, which is the pressure of the working fluid that is pressurized by the master cylinder in a state when the flow of the working fluid between the brake device and the master cylinder is being inhibited, is increased with increase of the master cylinder pressure.

The vehicle operator operates the brake operating member for generating the brake force whose amount is in accordance with his or her intension. As long as the variable-pressure chamber pressure continues to be increased during the braking operation, the brake force is increased depending on the operating force of the vehicle operator, namely, depending on the master cylinder pressure (i.e., the pressure of the working fluid pressurized by the master cylinder), so that the brake force whose amount is in accordance with the intention of the vehicle operator is generated. However, when the assistance limit is reached, the boosting effect is reduced whereby it becomes impossible to generate the brake force whose amount is in accordance with the intension of the vehicle operator. In the vehicle brake system according to this mode (7), after the assistance limit has been recognized, the brake force generated based on the working-fluid pressurizing device or the like can be increased with increase of the master cylinder pressure. Therefore, in the system according to this mode (7), it is possible to generate the brake force whose amount is in accordance with the intention of the vehicle operator, even after the assistance limit has been reached.

(9) The vehicle brake system according to mode (7) or (8), wherein the control device is configured, when the limit of the assistance made by the vacuum booster is recognized by the assistance-limit recognizing device, to control the adjusting device in accordance with a rule that is determined such that a difference between the brake acting pressure and the master cylinder pressure, which is the pressure of the working fluid that is pressurized by the master cylinder in a state when the flow of the working fluid between the brake device and the master cylinder is being inhibited, is increased with increase of the master cylinder pressure and such that a gradient or rate of increase of the difference after the pressure in the variable pressure chamber has become equal to the pressure of the atmosphere is higher than the rate of increase of the difference before the pressure in the variable pressure chamber becomes equal to the pressure of the atmosphere.

Even after the assistance limit has been recognized upon temporary reduction of the variable-pressure chamber pressure during inflow of the atmosphere into the variable pressure chamber, the difference between the variable-pressure chamber pressure and the negative-pressure chamber pressure is slightly increased in the process of change of the variable-pressure chamber pressure toward the atmospheric pressure. After the variable-pressure chamber pressure becomes equal to the atmospheric pressure, the difference between the variable-pressure chamber pressure and negative-pressure chamber pressure is little changed. Therefore, when the assistance limit has been recognized based on reduction of the variable-pressure chamber pressure, the assistance force is slightly increased by the braking operation until the variable-pressure chamber pressure becomes equal to the atmospheric pressure, but is little changed after the variable-pressure chamber pressure has become equal to the atmospheric pressure. That is, in the process of change of the variable-pressure chamber pressure toward the atmospheric pressure, the boosting effect provided by the vacuum booster is reduced upon reduction of the variable-pressure chamber pressure, and is further reduced after the variable-pressure chamber pressure has become equal to the atmospheric pressure. In the vehicle brake system according to this mode (9), after the assistance limit has been recognized, it is possible to increase the brake force that is generated based on activation of the working-fluid pressurizing device or the like such that the brake force is increased with increase of the master cylinder pressure, and also possible to increase the rate of increase of the brake force such that the increase rate is made higher after the variable-pressure chamber pressure has become equal to the atmospheric pressure than before the variable-pressure chamber pressure becomes equal to the atmospheric pressure. Therefore, in the vehicle brake system according to this mode (9), after the boosting effect has been reduced, even if the boosting effect is further reduced as a result of equalization of the variable-pressure chamber pressure with the atmospheric pressure, it is possible to generate the brake force whose amount is in accordance with the intention of the vehicle operator.

In the system according to this mode (9), the rate of increase (of the difference between the master cylinder pressure and the brake acting pressure which is the pressure of the working fluid that is pressurized by the master cylinder in a state when the flow of the working fluid between the brake device and the master cylinder is being inhibited) corresponds to an amount of increase of a difference between the variable-pressure chamber pressure and the negative-pressure chamber pressure per unit amount of increase of the master cylinder pressure when the difference between the variable-pressure chamber pressure and the negative-pressure chamber pressure is increased with increase of the master cylinder pressure. This rate of increase can be expressed by a rate of the difference to the amount of increase of the master cylinder pressure. Further, the determined rule is represented by a relationship between the master cylinder pressure and the difference (between the he variable-pressure chamber pressure and the negative-pressure chamber pressure), which relationship can be expressed by, for example, a function or a map data.

(11) An assistance-limit recognizing method for recognizing a limit of assistance made by a vacuum booster that is configured to assist an operating force applied to a brake operating member of a vehicle from an operator of the vehicle, the vacuum booster having a negative pressure chamber and a variable pressure chamber that is to be selectively brought into communication with the negative pressure chamber and an atmosphere, such that a communication between the variable pressure chamber and the negative pressure chamber is established, when the operating force is not being applied to the brake operating member from the operator, and such that a communication between the variable pressure chamber and the atmosphere is established while the communication between the variable pressure chamber and the negative pressure chamber is being cut off, when the operating force is being applied to the brake operating member, whereby the operating force applied to the brake operating member is assisted based on a pressure difference between a pressure in the negative pressure chamber and a pressure in the variable pressure chamber, the assistance-limit recognizing method being configured, upon the reduction of the pressure in the variable pressure chamber in process of change of the pressure in the variable pressure chamber toward a pressure of the atmosphere with application of the operating force to the brake operating member, to recognize the limit of the assistance made by the vacuum booster.

This mode (11) is a mode of the claimable invention, which recites the assistance-limit recognizing method. In the method arranged according to this mode (11), it is possible to recognize the assistance limit upon reduction of the boosting effect before the variable-pressure chamber pressure becomes equal to the atmospheric pressure.

BRIEF DESCRIPTION OF DRAWINGS

FIGS. 4A and 4B are partial cross-sectional views each showing a pressure control valve that is included in the working-fluid-pressure control device of FIG. 3.

BEST MODE FOR CARRYING OUT THE INVENTION

There will be described an embodiment of the claimable invention, by reference to the accompanying drawings. It is to be understood that the claimable invention is not limited to the following embodiment, and may be otherwise embodied with various changes and modifications, such as those described in the foregoing "MODES OF THE INVENTION", which may occur to those skilled in the art.

<Construction of Vehicle Brake System>

Figure 1:
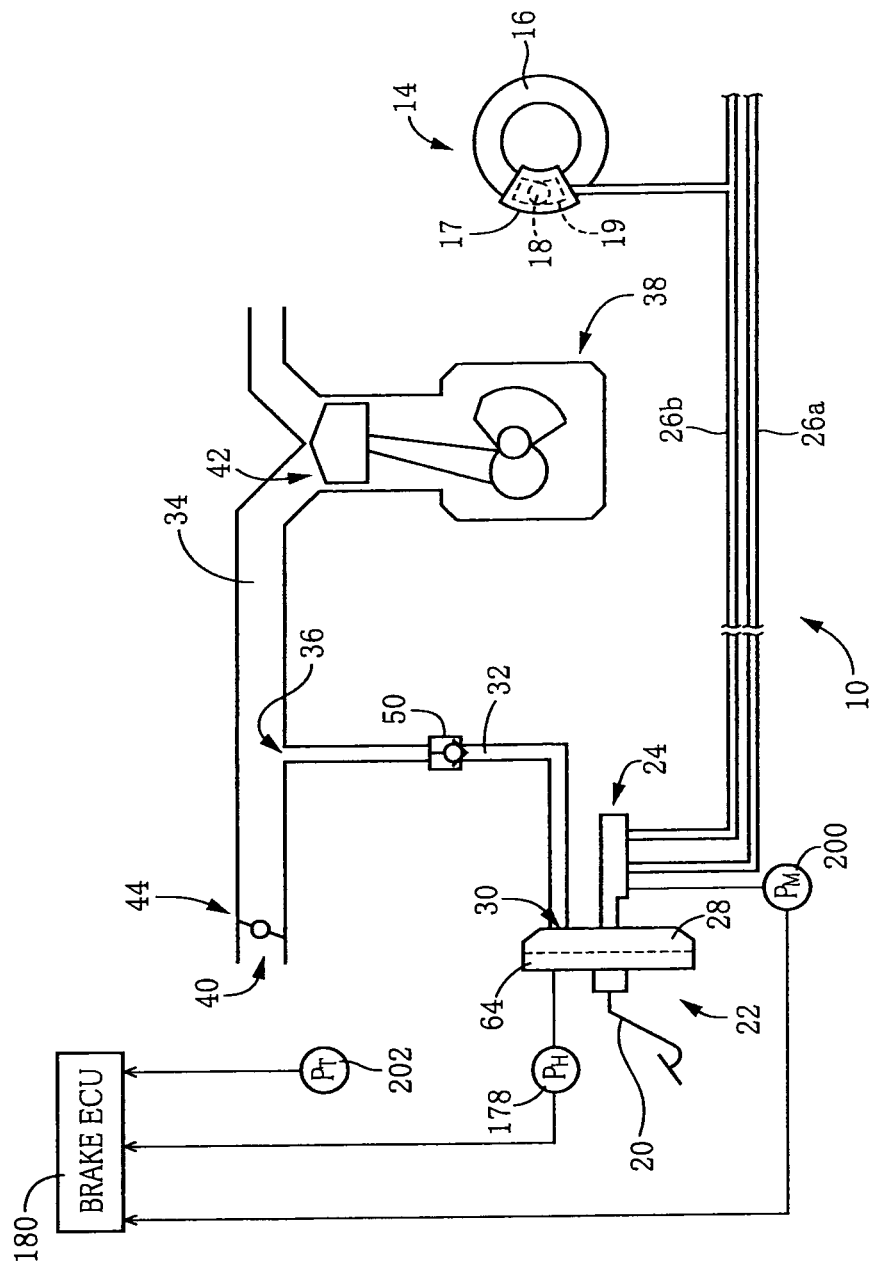
FIG. 1 is a view schematically showing a vehicle brake system constructed according to an embodiment of the claimable invention.

FIG. 1 schematically shows a brake system 10 constructed according to the embodiment. The brake system 10 for a vehicle includes brake devices 14 each of which is provided for a corresponding one of wheels of the vehicle, as shown in FIG. 1 in which only one of the brake devices 14 is illustrated. Each of the brake devices 14 is constituted by a disc brake device, and includes a brake disc 16, a brake caliper 17, a brake cylinder 18 and a brake pad 19. The brake disc 16 is rotatable together with the corresponding wheel. The brake cylinder 18 and the brake pad 19 are held by the brake caliper 17.

When a brake pedal 20 as an example of a brake operating member is operated by an operating force applied from an operator of the vehicle, the operating force is assisted by a vacuum booster 22 that is connected to the brake pedal 20. The operating force, which is assisted by the vacuum booster 22, is transmitted to a master cylinder 24 that is connected to the vacuum booster 22, whereby a working fluid stored in the master cylinder 24 is pressurized by the operating force. A change of fluid pressure of the working fluid is transmitted from the master cylinder 24 to the brake cylinders 18 of the brake devices 14 (which are provided for the respective wheels) via communication passages defined in communication-passage definers in the form of main supply conduits 26a, 26b. In each of the brake devices 14, the brake cylinder 18 is activated by the pressurized working fluid, so as to cause the brake pad 19 to be pressed against the brake disc 16, so that a friction is generated between the brake pad 19 and the brake disc 16, and a brake force is generated based on the friction, for thereby restraining rotation of the corresponding wheel and decelerating the vehicle. It is noted that detailed description of the brake device 14 is not provided herein.

The vacuum booster 22 has a negative pressure chamber 28 that is to be placed in a negatively pressurized state. The negative pressure chamber 28 has a vacuum port 30 (see FIG. 2) to which a negative-pressure supply conduit 32 is connected. The negative-pressure supply conduit 32 is connected to a junction portion 36 of an intake manifold 34. The intake manifold 34 has openings in its respective opposite ends, and serves as an air intake conduit through which an air is to be supplied to an engine 38. Described in detail, one of the openings of the intake manifold 34 serves as a suction port 40 through which the air is to be sucked from an atmosphere, while the other of the openings of the intake manifold 34 is connected to an intake portion 42 of the engine 38 through which of the air is to be taken into the engine 38. A electrically-controlled throttle valve 44 is disposed in the intake manifold 34, and is located between the intake port 40 and the junction portion 36, so that an amount of air to be taken into the engine 38 is adjustable by the throttle valve 44. Owing to this arrangement, a portion of an inside of the intake manifold 34, which is defined between the throttle valve 44 and the intake portion 42, can be placed in the negatively pressurized state, depending upon, for example, an opening angle of the throttle valve 44 and number of revolutions of the engine 38. Therefore, an inside of the negative-pressure supply conduit 32 (connected to the junction portion 36) and the negative pressure chamber 28 (connected to the negative-pressure supply conduit 32) can be also placed in the negatively pressurized state. Further, a check valve 50 is disposed in the negative-pressure supply conduit 32. This check valve 50 is configured to allow supply of negative pressure from the intake manifold 34 to the negative pressure chamber 28 and allow inhibit supply of negative pressure from the negative pressure chamber 28 to the intake manifold 34. In other words, the check valve 50 is configured to inhibit supply of air from the intake manifold 34 to the negative pressure chamber 28 and inhibit supply of air from the negative pressure chamber 28 to the intake manifold 34.

Figure 2:
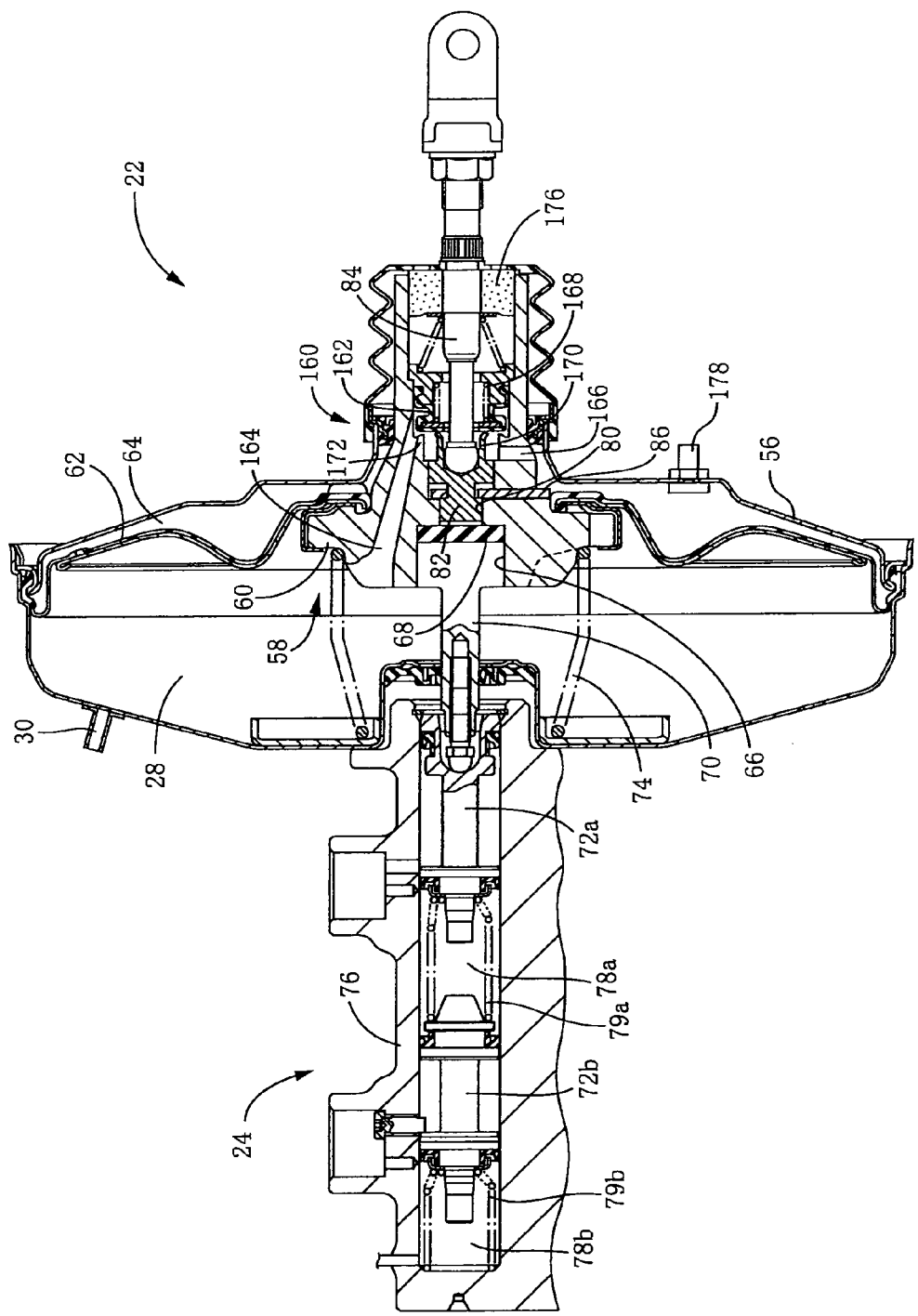
FIG. 2 is a partial cross-sectional view showing a vacuum booster and a master cylinder that are included in the vehicle brake system of FIG. 1.

FIG. 2 is a partial cross-sectional view showing the vacuum booster 22 and the master cylinder 24. The vacuum booster 22 includes a hollow housing 56 and a power piston 58 that is disposed in the housing 56. The power piston 58 includes a hub 60 and a diaphragm 62 which cooperate with each other to divide an inner space within the housing 56 into the negative pressure chamber 28 as a master-cylinder side chamber (located on a side of the master cylinder 24) and a variable pressure chamber 64 as a brake-pedal side chamber (located on a side of the brake pedal 20).

A recess 66 is provided in a portion of the hub 60 which portion is located on a side of the master cylinder 24. A rear cushion disc 68, which is made of a rubber, is fitted in the recess 66. A push rod 70, which has axially opposite end portions, is introduced at one of the axially opposite end portions in the recess 66, and is engaged at the other of the axially opposite end portions with a pressurizing piston 72*a* of the master cylinder 24. A compression coil spring 74 is disposed in parallel with the push rod 70.

The master cylinder 24 includes a housing 76 and two pressurizing pistons 72*a*, 72*b* which are disposed inside the housing 76. The two pressurizing pistons 72*a*, 72*b* are arranged in series with each other, and are slidably fitted in the housing 76. The housing 76 and the two pressurizing pistons 72*a*, 72*b* cooperate to define two pressurized chambers 78*a*, 78*b* which are contiguous to the two pressurizing pistons 72*a*, 72*b*, respectively. Two compression coil springs 79*a*, 79*b* are disposed in the two pressurized chambers 78*a*, 78*b*, respectively.

A stepped hole 80 is provided in a brake-pedal side portion of the hub 68 (which is on a side of the brake pedal 20), and is in communication with the recess 66. A reaction rod 82 is fitted in the stepped hole 80, and is engaged with a valve operating rod 84. The valve operating rod 84 is engaged at one of its opposite end portions with the reaction rod 82, and is engaged at the other of its opposite end portions with the brake pedal 20. The hub 60 and the reaction rod 82 are connected to each other via a plate-like shaped stopper key 86 in the recess 66. In this arrangement, upon operation of the brake pedal 20, the hub 60 is moved through the valve operating rod 84 and the reaction rod 82, and the pressurizing piston 72*a* of the master cylinder 24 is moved through the reaction disc 68 and the push rod 70 as a result of the movement of the hub 60. That is, the master cylinder 24 is constructed such that the pressurizing piston 72*a* is moved by operation of the brake pedal 20. Then, as a result of the movement of the pressurizing piston 72*a*, the working fluid stored in the pressurized chamber 78*a* is pressurized, and the pressurizing piston 72*b* is moved by the pressurized working fluid.

Figure 3:
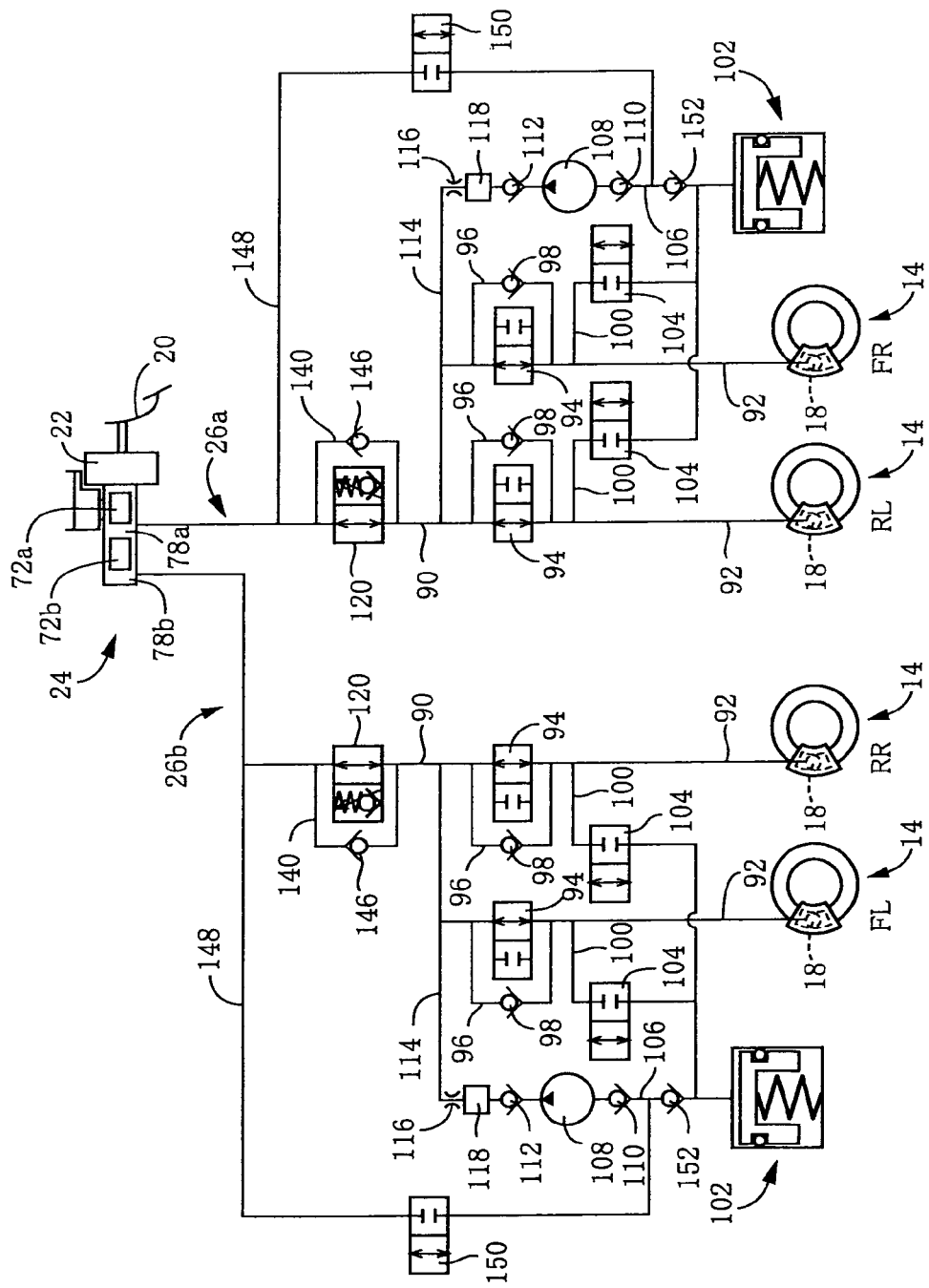
FIG. 3 is a view schematically showing a working-fluid-pressure control device that is included in the vehicle brake system of FIG. 1.

As shown in FIG. 3, the main supply conduits 26*a*, 26*b* are connected to the pressurized chambers 78*a*, 78*b*, respectively, so that a pressure increase of the working fluid can be transmitted to the brake cylinders 18 provided for the respective wheels via two conduit systems. The main supply conduit 26*a* is connected to two brake cylinders 18 provided for the front right and rear left wheels while the main supply conduit 26*b* is connected to two brake cylinders 18 provided for the front left and rear right wheels. Since the two conduit systems have respective arrangements that are similar to each other, only one of the two conduit systems (which includes the main supply conduit 26*a*) will be described herein while the other conduit system (which includes the main supply conduit 26*b*) will not be described herein.

The main supply conduit 26*a*, which extends from the pressurized chamber 78*a*, is branched into two conduits, so that the main supply conduit 26*a* is constituted by a single trunk conduit 90 and two branch conduits 92 that are connected to the trunk conduit 90. Each of the branch conduits 92 is connected at its distal end portion with a corresponding one of the brake cylinders 18. A pressure-increase control valve 94 consisting of a normally-open electromagnetic valve is provided in an intermediate portion of each of the two branch conduits 92, so that the working fluid is allowed to flow from the master cylinder 24 toward the brake cylinder 18 when the pressure-increase control valve 94 is being placed in its open state. A bypass conduit 96 is connected to each of the two branch conduits 92, so as to bypass the pressure-increase control valve 94. A check valve 98, which is provided in each of the bypass conduits 96, is configured to inhibit flow of the working fluid from the master cylinder 24 toward the brake cylinder 18, and to allow flow of the working fluid from the brake cylinder 18 toward the master cylinder 24. A reservoir conduit 100 extends to a reservoir 102 from a portion of each branch conduit 92 which portion is located between the pressure-increase control valve 94 and the brake cylinder 18. A pressure-reduction control valve 104 consisting of a normally-close electromagnetic valve is provided in an intermediate portion of each reservoir conduit 100, so that the working fluid is allowed to flow from the brake cylinder 18 toward the reservoir 102 when the pressure reduction control valve 104 is being placed in its open state.

The reservoir 102 is connected to a suction port of a pump 108 via a pump conduit 106, and is configured to store therein the working fluid such that the stored working fluid is pressurized by a spring. An inlet-side valve 110 consisting of a check valve is provided on a side of the suction port of the pump 108 while an outlet-side valve 112 consisting of a check valve is provided on a side of a delivery port of the pump 108. The delivery port of the pump 108 is connected to the trunk conduit 90 via a sub-supply conduit 114. In the sub-supply conduit 114, an orifice 116 and a fixed damper 118 are provided to reduce a pressure pulsation of the working fluid pressurized by the pump 108.

A pressure control valve 120 is provided in a portion of the trunk conduit 90 which portion is located between the master cylinder 24 and a connection point at which the trunk conduit 90 is connected to the sub-supply conduit 114. When the pump 108 is not being activated, the pressure control valve 120 is configured to allow flow of the working fluid in bilateral direction between the master cylinder 24 and the brake cylinder 18. When the pump 108 is being activated, the pressure control valve 120 is configured to release the pressurized working fluid delivered from the pump 108, toward the master cylinder 24, such that a delivery pressure of the pump 108 for release of the working fluid toward the master cylinder 24 is controlled based on the fluid pressure in the master cylinder 24. Described specifically, as shown in FIG. 4, the pressure control valve 120 has a housing (not shown), a valve member 130, a valve seat 132 (that is disposed on one of opposite sides of the valve member 130 which one is closer to the brake cylinder 18) and a solenoid 134 that is configured to control a movement of the valve member 130 relative to the valve seat 132. When the solenoid 134 is being placed in its de-energized state, the valve member 130 is separated from the valve seat 132 owing to an elastic force of the spring 136, as shown in FIG. 4A, whereby the working fluid is allowed to flow in the bilateral directions (i.e., a direction toward the master cylinder 24 and a direction toward the brake cylinder 18). That is, the pressure control valve 120 is open when the solenoid 134 is being placed in its de-energized state. When the solenoid 134 is being placed in its energized state, the valve member 130 is forced toward the valve seat 132 owing to an electromagnetic force of the solenoid 134, so as to be seated onto the valve seat 132, as shown in FIG. 4B. In this instance, a force F1 based on a difference between the fluid pressure in the brake cylinder 18 (hereinafter referred to as "brake cylinder pressure" or "brake acting pressure" where appropriate) and the fluid pressure in the master cylinder 24 (hereinafter referred to as "master cylinder pressure" where appropriate) and an elastic force F2 of the spring 136 act on the valve member 130 in a valve-opening direction that causes the valve member 130 to be moved away from the valve seat 132. Meanwhile, a force F3 which is based on the electromagnetic force of the solenoid 134 acts on the valve member 130 in a valve-closing direction that causes the valve member 130 to be seated on the valve seat 132. That is, when the solenoid 134 is being placed in its energized state, a sum of the forces F1, F2 and the force F3 act on the valve member 130 in respective opposite directions.

In the pressure control valve 120 constructed as described above, while the sum of the forces F1, F2 is not being larger than the force F3 upon energization of the solenoid 134, the valve member 130 is seated on the valve seat 132 whereby the working fluid is inhibited from flowing from the pump 108 toward the master cylinder 24. Thus, the delivery pressure of the pump 108 is increased by activation of the pump 108 whereby the fluid pressure higher than the master cylinder pressure can be caused to act on the brake cylinder 18. When the sum of the forces F1, F2 becomes larger than the force F3 as a result of increase of delivery pressure of the pump 108, i.e., as a result of increase of the brake cylinder pressure, the valve member 130 is moved away from the valve seat 132 whereby the working fluid is allowed to flow from the pump 108 toward the master cylinder 24. Thus, the delivery pressure of the pump 108, i.e., the brake cylinder pressure is substantially kept at a value at a point of time when the sum of the forces F1, F2 becomes larger than the force F3. That is, by activating the pump 108 upon energization of the solenoid 134, the fluid pressure whose value is higher than the master cylinder pressure by a value corresponding or proportional to a value that is obtained by subtracting the force F2 from the force F3, can be caused to act on the brake cylinder. Further, since the elastic force F2 of the spring 136 is kept substantially constant when the valve member 130 is being seated on the valve seat 132, it is possible to control the force F1 that is based on the difference between the brake cylinder pressure and the master cylinder pressure, by controlling the force F3, i.e., an amount of electric current supplied to the solenoid 134. That is, by controlling the amount of electric current supplied to the solenoid 134, it is possible to control the difference between the brake cylinder pressure and the master cylinder pressure, i.e., a value obtained by subtracting the master cylinder pressure from the brake cylinder pressure. Thus, the pressure control valve 120 is configured to switch a flowing state of the working fluid between a flow allowing state (in which the working fluid is allowed to flow through the valve 120) and a flow inhibiting state (in which the working fluid is inhibited from flowing through the valve 120), and is configured to control or adjust the brake cylinder pressure when the flow inhibiting state is being established. That is, the pressure control valve 120 serves as a communication-state switching device, and serves also as an adjusting device.

As shown in FIG. 3, a bypass conduit 140 is connected to the trunk conduit 90, so as to bypass the pressure control valve 120. A check valve 146, which is provided in the bypass conduits 140, is configured to allow flow of the working fluid from the master cylinder 24 toward the brake cylinder 18, and to inhibit flow of the working fluid from the brake cylinder 18 toward the master cylinder 24. An auxiliary conduit 148 is provided to extend from a portion of the trunk conduit 90 which portion is located between the master cylinder 24 and the pressure control valve 120, to the pump conduit 106. An inflow control valve 150 consisting of a normally-close electromagnetic valve is provided in an intermediate portion of the auxiliary conduit 148. Further, a check valve 152 is provided between a connection point at which the pump conduit 106 and the auxiliary conduit 148 are connected to each other and a connection point at which the pump conduit 106 and the reservoir conduit 100 are connected to each other. This check valve 152 is configured to inhibit flow of the working fluid from the auxiliary conduit 148 toward the reservoir 102, and to allow flow of the working fluid from the reservoir 102 toward the auxiliary conduit 148.

Owing to the arrangement as described above, when the brake pedal 20 is being depressed by an operator of the vehicle in a state in which the pressure-increase control valve 94 and pressure control valve 120 are opened while the pressure-reduction control valve 104 and inflow control valve 150 are closed, the working fluid stored in the pressurized chambers 78a, 78b is pressurized by movements of the pressurizing pistons 72a, 72b, and the pressure increase of the working fluid is transmitted to the brake devices 14 provided for the respective wheels via the main supply conduits 26a, 26b as communication-passage definers each defining a communication passage, whereby the brake force is generated by each of the brake devices 14.

As shown in FIG. 2, a valve mechanism 160 is provided inside the hub 60 that constitutes a part of the power piston 58 of the vacuum booster 22. The valve mechanism 160 is configured to selectively establish and cut off a communication between the negative pressure chamber 28 and the variable pressure chamber 64, and to selectively establish and cut off a communication between the variable pressure chamber 64 and the atmosphere. The valve mechanism 160 is capable of selectively establishing and cutting off the communication between the negative pressure chamber 28 and the variable pressure chamber 64, and selectively establishing and cutting off the communication between the variable pressure chamber 64 and the atmosphere, in response to movement of the valve operating rod 84 which is caused by operation of the brake pedal 20.

Described in detail, the valve mechanism 160 has a control valve 162, a first communication hole 164 and a second communication hole 166. The control valve 162 is disposed inside the hub 60, and the valve operating rod 84 extends through the control valve 162. The negative pressure chamber 28 can be in communication with an inside of the hub 60 via the first communication hole 164. The variable pressure chamber 64 can be in communication with the inside of the hub 60 via the second communication hole 166. The control valve 162 is forced toward the reaction rod 82, by a coil spring 168 that is disposed in parallel with the valve operating rod 84. In a state (as shown in FIG. 2) in which the brake pedal 20 is not being depressed, the control valve 162 is in contact, at one of its opposite end portions which one is on a side of the master cylinder 24, with a boss portion 170 provided in one of opposite end portions of the reaction rod 82 which one is on a side of the brake pedal 20. In this state, a master-cylinder side portion of an inner space of the hub 60 (i.e., a portion of the inner space of the hub 60 which portion is on a side of the master cylinder 24) is isolated from the atmosphere by cooperation of the control valve 162 and the boss portion 170, and the first and second communication holes 164, 166 open in the master-cylinder side portion of the inner space of the hub 60. That is, the negative pressure chamber 28 and the variable pressure chamber 64 are brought into communication with each other while the variable pressure chamber 64 is isolated from the atmosphere, so that the variable pressure chamber 64 as well as the negative pressure chamber 28 is placed in the negatively pressurized state such that an air pressure in the variable pressure chamber 64 and an air pressure in the negative pressure chamber 28 are substantially equalized to each other.

Figure 5A:
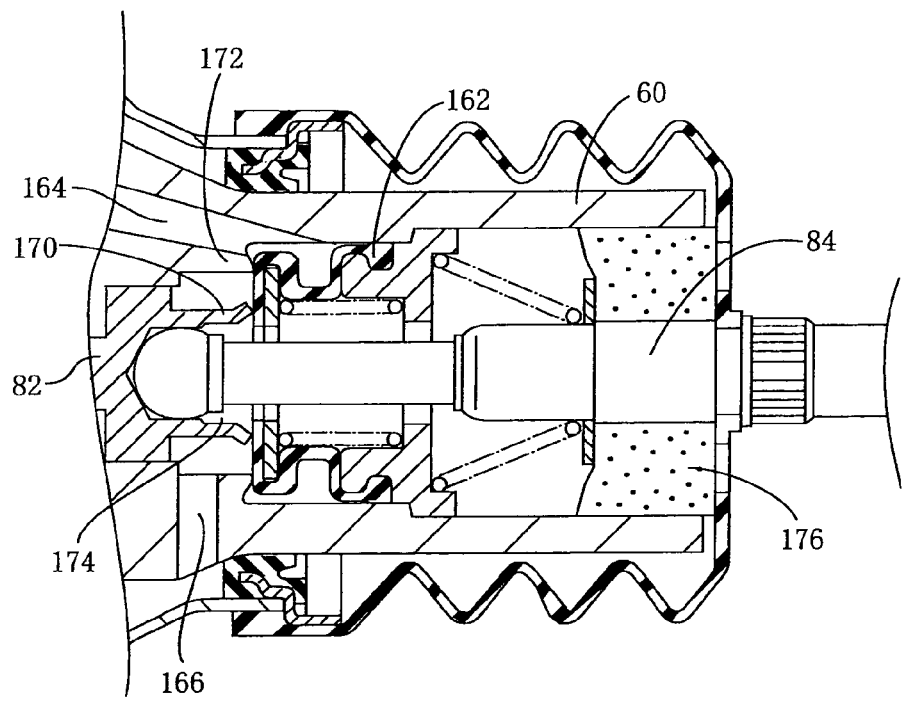
FIGS. 5A and 5B are partial cross-sectional views each showing, in enlargement, a part of the vacuum booster of FIG. 2.

When the brake pedal 20 is depressed by the vehicle operator, the valve operating rod 84 is moved toward the master cylinder 24, and the reaction rod 82 and the control valve 162 are also moved toward the master cylinder 24 together with the movement of the valve operating rod 84. As a result of movement of the control valve 162, as shown in FIG. 5A, the control valve 162 is brought into contact with a protrusion portion 172 that is provided on a inner side of the opening of the first communication hole 164 in a radial direction of the hub 60, so that a portion of an inner space 174 of the hub 60, which is isolated from the atmosphere, is in communication with only the second communication hole 166 and is not in communication with the first communication hole 164. That is, in this state as shown in FIG. 5A, the variable pressure chamber 64 is isolated from the atmosphere and the negative pressure chamber 28.

Figure 5B:
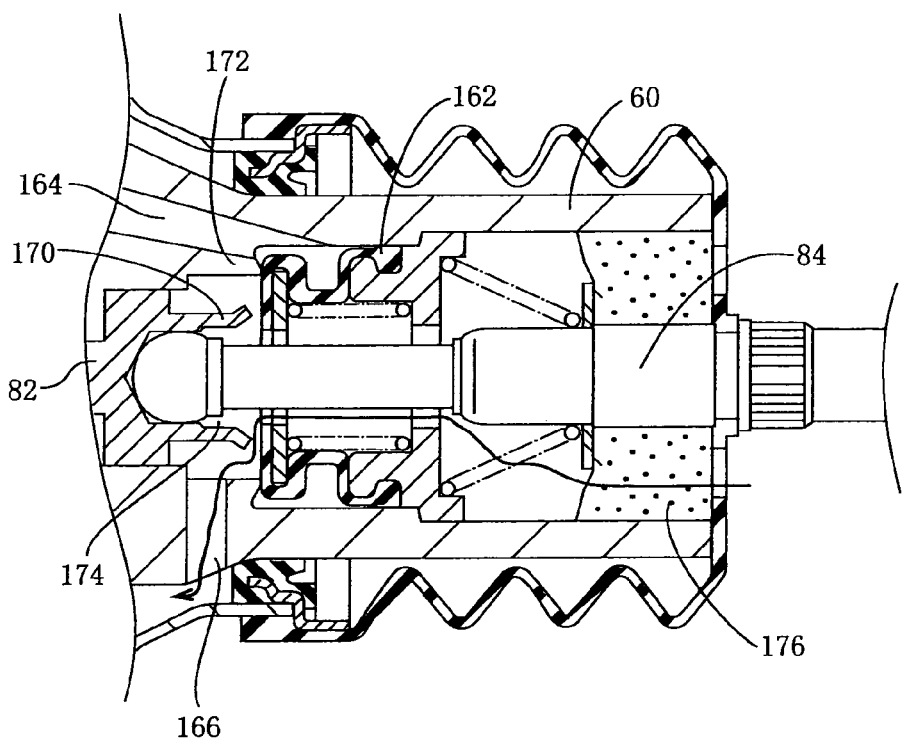

Then, when the brake pedal 20 is further depressed by the vehicle operator, the boss portion 170 of the reaction rod 82 is released from the control valve 162, as shown in FIG. 5B. In this instance, the control valve 162 is not moved toward the master cylinder 24 since the control valve 162 is in contact with the protrusion portion 172, while the reaction rod 82 is moved together with the valve operating rod 84 toward the master cylinder 24, whereby the boss portion 170 is separated from the control valve 162. As a result of separation of the boss portion 170 from the control valve 162, the inner space 174 of the hub 60 (i.e., a portion of an inner space of the hub 60, which portion is closer to the master cylinder 24 than the other portion of the inner space of the hub 60) is in communication with the atmosphere via a clearance defined between the control valve 162 and the boss portion 170, and is in communication also with the second communication hole 166. That is, in this state as shown in FIG. 5B, the negative pressure chamber 28 and the variable pressure chamber 64 are isolated from each other while the variable pressure chamber 64 and the atmosphere are in communication with each other, so that the negative pressure chamber 28 is placed in the negatively pressurized state while a negative pressure of the variable pressure chamber 64 is reduced to zero (namely, an absolute pressure of the variable pressure chamber 64 becomes equal to the atmospheric pressure) as a result of inflow of the atmosphere into the variable pressure chamber 64. Therefore, a pressure difference is established between the negative pressure chamber 28 and the variable pressure chamber 64. A differential pressure force based on this pressure difference acts on the power piston 58 in the same direction as direction of movement of the power piston 58 which is made by the operating force applied by the vehicle operator, so that the operating force can be assisted by the vacuum booster 22 during the braking operation. It is noted that a filter 176 is disposed in one of opposite end portions of the hub 60 which one is located on a side of the brake pedal 20, for avoiding dust or foreign matters from entering into the variable pressure chamber 64, upon inflow of the atmosphere into the variable pressure chamber 64, as indicated by arrow in FIG. 5B, via an atmosphere inflow passage defined in the hub 60 that serves as an inflow-passage definer. The filter 176 is disposed in an inner peripheral portion of the above-described one of the opposite end portions of the hub 60, and the valve operating rod 84 extends through the filter 176.

When the operating force applied to the brake pedal 20 is released, the reaction rod 82 is moved together with the valve operating rod 84 toward the brake pedal 20, and the boss portion 170 of the reaction rod 82 is brought into contact with the control valve 162, as shown in FIG. 5A. Then, when the reaction rod 82 is further moved together with the valve operating rod 84 toward the brake pedal 20, the control valve 162 is moved by the reaction rod 82 toward the brake pedal 20 whereby the control valve 162 is separated from the protrusion portion 172, as shown in FIG. 2. That is, the variable pressure chamber 64 is made isolated from the atmosphere, and is then brought into communication with the negative pressure chamber 28. As a result of communication of the variable pressure chamber 64 with the negative pressure chamber 28, the air pressure in the negative pressure chamber 28 and the air pressure in the variable pressure chamber 64 become equal to each other, and the negative pressure chamber 28 and the variable pressure chamber 64 are placed in their negatively pressurized states. That is, the pressure difference between the negative pressure chamber 28 and the variable pressure chamber 64 is made zero and the operating force is also made zero, whereby the pressurizing piston 72 and the power piston 58 are caused, by compression coil forces of the compression coil springs 79a, 79b, to be returned to their original positions, i.e., positions in a state of non-operation of the brake pedal 20. It is noted that a pressure sensor 178 is disposed in the housing 56 of the vacuum booster 22 so as to detect a value of the air pressure in the variable pressure chamber 64.

Figure 14:
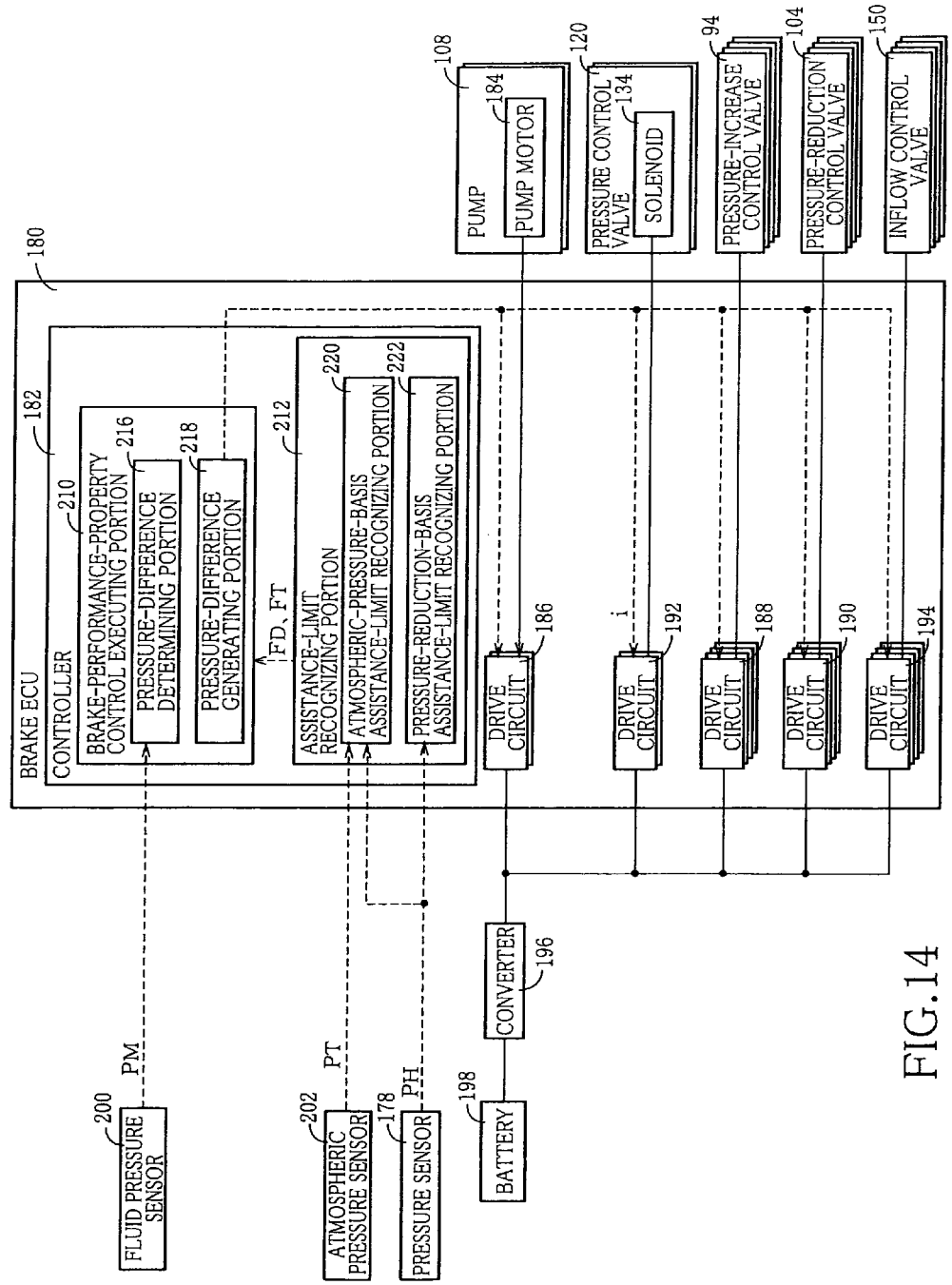
FIG. 14 is a block diagram showing various functions of a control device for controlling the vehicle brake system.

As shown in FIG. 1, a brake electronic control unit (hereinafter simply referred to as "brake ECU") 180 is provided in the vehicle brake system 10. The brake ECU 180 is a control device configured to control activations of the control valves 94, 104, 120, 150 and the pump 108, for thereby controlling the fluid pressure of the working fluid that is to act on the brake cylinder 18 of each brake device 14. As shown in FIG. 14, the brake ECU 180 includes: a controller 182 that is constituted principally by a computer including CPU, ROM and RAM; and drive circuits 186, 188, 190, 192, 194. The drive circuit 186 is provided for a pump motor 184 of the pump 108. The drive circuits 188, 190, 192, 194 are provided for the control valves 94, 104, 120, 150, respectively. A battery 198 is connected to the plurality of drive circuits 186, 188, 190, 192, 194 via a converter 196, so that an electric power can be supplied to the pump motor 184 and the control valves 94, 104, 120, 150.

To the plurality of drive circuits 186, 188, 190, 192, 194, there is further connected the controller 182 so that various control signals can be transmitted from the controller 182 to the drive circuits 186, 188, 190, 192, 194. Described in detail, the controller 182 is configured to transmit a motor drive signal to the drive circuit 186 that is provided for the pump motor 184, and transmit control signals to the drive circuits 188, 190, 194 provided for the pressure-increase control valve 94, pressure-reduction control valve 104 and inflow control valve 150, for thereby selectively opening and closing the valves 94, 104, 150. Further, the controller 182 is configured to transmit an electric-current control signal to the drive circuit 192 provided for the pressure control valve 120, for thereby controlling an electromagnetic force that is be generated by the solenoid 134 of the pressure control valve 120. Thus, the activations of the pump motor 184 and the control valves 94, 104, 120, 150 are controlled by the controller 182 which transmits the control signals to the drive circuits 186, 188, 190, 192, 194.

To the controller 182, there are connected, in addition to the above-described pressure sensor 178, a fluid pressure sensor 200 and an atmospheric pressure sensor 202. The fluid pressure sensor 200 is provided for detecting a value of the master cylinder pressure that is the fluid pressure in the master cylinder 24. The atmospheric pressure sensor 202 is provided for detecting a value of the atmospheric pressure. In FIG. 14, reference signs $P_H$, $P_M$, $P_T$ in parentheses represent the values which are detected by the pressure sensor 178, fluid pressure sensor 200 and atmospheric pressure sensor 202, respectively, and which are to be used in controlling the brake system 10 as described later.

<Control of Vehicle Brake System>

In the brake system 10, normally, the pressure-increase control valve 94 and the pressure control valve 120 are opened while the pressure-reduction control valve 140 and the inflow control valve 150 are closed. When the brake pedal 20 is depressed by the vehicle operator, the working fluid in the master cylinder 24 is pressurized, and the consequent increase of the working fluid is transmitted to the brake devices 14 provided for the respective wheels via the main supply conduits 26a, 26b. Thus, the brake force is generated by each of the brake devices 14 owing to the pressurized working fluid. That is, normally, the brake device 14 is configured to generate the brake force based on the working fluid pressurized by cooperation of the operating force applied by the vehicle operator and the assisting force generated by the vacuum booster 22.

As described above, the vacuum booster 22 is arranged to generate the assisting force (which is to assist the operating force applied by the vehicle operator) by utilizing the pressure difference between the variable pressure chamber 64 and the negative pressure chamber 28 which is established as a result of inflow of the atmosphere into the variable pressure chamber 64 in the braking operation. In this arrangement, the assisting force is increased until the variable-pressure chamber pressure (i.e., the air pressure in the variable pressure chamber 64) becomes equal to the atmospheric pressure. However, the assisting force is not increased after the variable-pressure chamber pressure has become equal to the atmospheric pressure. Therefore, although the master cylinder pressure is increased by increase of the operating force and increase of the assisting force until the variable-pressure chamber pressure reaches the atmospheric pressure, the master cylinder pressure is increased by only the increase of the operating force after the variable-pressure chamber pressure has reached the atmospheric pressure. A relationship between the operating force (depressing force) F (applied by the vehicle operator) and the mater cylinder pressure $P_M$ is represented by solid line in a graph of FIG. 6. It is noted that reference sign $F_T$ in the graph of FIG. 6 represents a value of the operating force when the variable-pressure chamber pressure reaches the atmospheric pressure.

Figure 6:
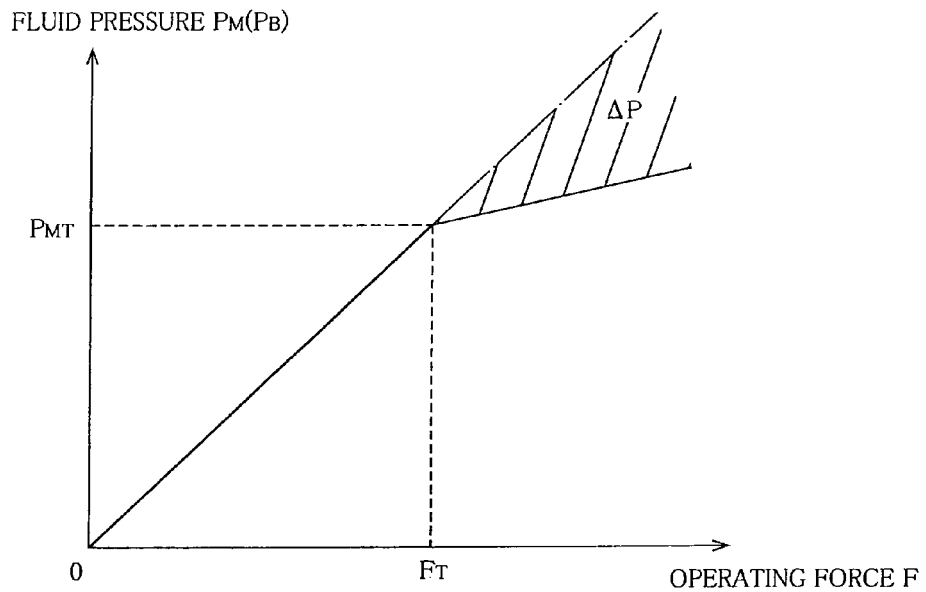
FIG. 6 is a graph showing a relationship between a master cylinder pressure (brake cylinder pressure) and an operating force applied by a vehicle operator.

As is understood from the graph of FIG. 6, after an actual value of the operating force F has exceeded the value $F_T$, a rate (i.e., gradient) of increase of the master cylinder pressure $P_M$ is drastically reduced. A vertical axis of the graph of FIG. 6 may be considered to represent a brake cylinder pressure $P_B$ that is the fluid pressure of the working fluid acting on each brake cylinder 18, because the master cylinder pressure $P_M$ is substantially equal to the fluid pressure of the working fluid acting on the brake cylinder 18 in a state in which the pressure-increase control valve 94 and the pressure control valve 120 are opened while the pressure-reduction control valve 104 and the inflow control valve 150 are closed. That is, when the variable-pressure chamber pressure becomes equal to the atmospheric pressure, a limit of the assistance made by the vacuum booster 22 is reached so that the rate of increase of the brake force is drastically reduced. If the rate of increase of the brake force is reduced, namely, if an amount of increase of the brake force per unit operating force is reduced, there would be a risk that a discomfort is given to the vehicle operator who carries out a braking operation and who is likely to feel reduction in performance of the brake system 10. In this sense, the drastic reduction of the rate of increase of the brake force is not desirable.

In the brake system 10, there is executed a brake-performance-property control, i.e., a control for increasing the brake cylinder pressure $P_B$, for avoiding drastic reduction of the rate of increase of the brake force and the consequent reduction of the braking performance. Described in detail, the control is executed to activate the pump 108 as a working-fluid pressurizing device so as to pressurize the working fluid by activation of the pump 108 after the limit of the assistance by the vacuum booster 22 has been reached, for the purpose of causing the brake cylinder pressure $P_B$ to be changed as indicated by one-dot chain line in the graph of FIG. 6 even after the limit of the assistance by the vacuum booster 22 has been reached. Described specifically, after the limit of the assistance by the vacuum booster 22 has been reached, the inflow control valve 150 and the pump 108 are opened and activated, respectively, while the pressure-increase control valve 94 and the pressure-reduction control valve 104 are kept opened and closed, respectively. Further, in this instance, the solenoid 134 of the pressure control valve 120 is placed in its energized state. As described above, the pressure control valve 120 is constructed to be capable of controlling the pressure difference between the brake cylinder pressure $P_B$ and the master cylinder pressure $P_M$, more precisely, controlling the pressure difference $\Delta P$ that is obtained by subtracting the master cylinder pressure $P_M$ from the brake cylinder pressure $P_B$, owing to control of an amount of electric current that is be supplied to the solenoid 134 of the pressure control valve 120. Therefore, it is possible to cause the brake cylinder pressure $P_B$ to be changed as indicated by the one-dot chain line in the graph of FIG. 6, by controlling the amount of electric current supplied to the solenoid 134 such that the pressure difference $\Delta P$ is substantially equal to an amount corresponding to a hatched region in the graph of FIG. 6.

Figure 7:
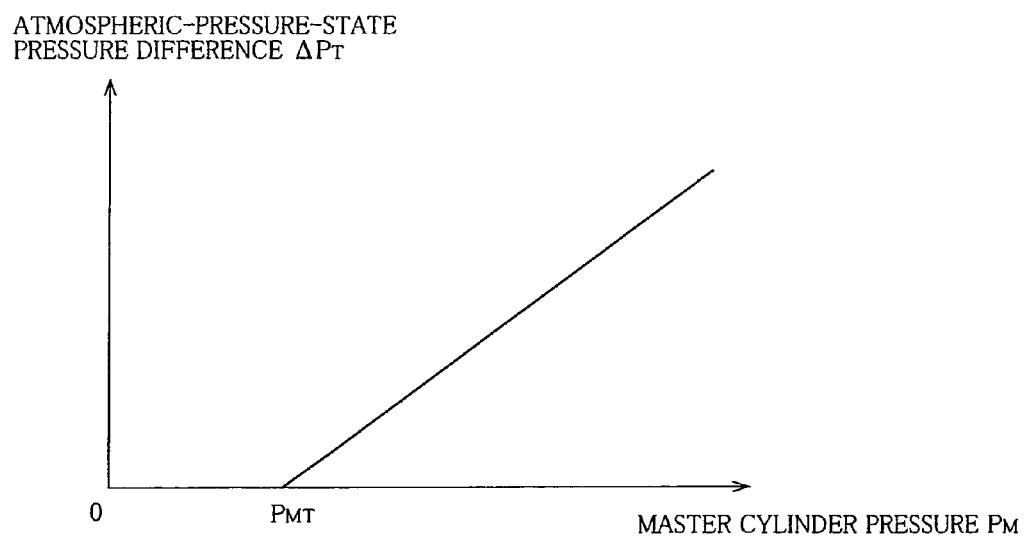
FIG. 7 is a graph showing a relationship between a master cylinder pressure and an atmospheric-pressure-state pressure difference.

In the brake system 10, the amount of electric current supplied to the solenoid 134 is controlled such that the pressure difference $\Delta P$ between the brake cylinder pressure and the master cylinder pressure is increased with increase of the operating force F, namely, with increase of the master cylinder pressure $P_M$, after the limit of the assistance by the vacuum booster 22 has been reached, as shown in the graph of FIG. 6. Described specifically, the computer of the controller 182 stores therein a map data, as shown in a graph of FIG. 7, which relates to the pressure difference $\Delta P$ that is dependent on a parameter in the form of the master cylinder pressure $P_M$, i.e., a map data which relates to the pressure difference (hereinafter referred to as "atmospheric-pressure-state pressure difference" where appropriate) $\Delta P_T$ that is to be established after the variable-pressure chamber pressure has become equal to the atmospheric pressure. Thus, a target value of the atmospheric-pressure-state pressure difference $\Delta P_T$ is determined with reference to the stored data map as a predetermined rule. It is noted that reference sign $P_{MT}$ in the graph of FIG. 7 represents a value of the master cylinder pressure when the variable-pressure chamber pressure reaches the atmospheric pressure. After determination of the target value of the atmospheric-pressure-state pressure difference $\Delta P_T$, an amount of electric current i, which is to be supplied to the solenoid 134 of the pressure control valve 120, is determined such that the force F3 generated by the solenoid 134 is substantially equal to a sum of the force F1 based on the determined target value of the atmospheric-pressure-state pressure difference $\Delta P_T$ and the elastic force F2 of the spring 136 of the pressure control valve 120. After determination of the amount of the electric current i, the determined amount of the electric current i is supplied to the solenoid 134 of the pressure control valve 120, and the pump 108 is activated, whereby the brake cylinder pressure $P_B$ can be changed as indicated by the one-dot chain line of FIG. 6, thereby making it possible to maintain consistency of performance of the brake system 10 not only before but also after the limit of the assistance by the vacuum booster 22 is reached.

In the above-described brake-performance-property control, it is recognized that the assistance limit is reached at a point of time at which the variable-pressure chamber pressure becomes equal to the atmospheric pressure, and then the working fluid acting on the brake device is pressurized after that point of time. This is because, when the variable-pressure chamber pressure becomes equal to the atmospheric pressure, the pressure difference between the negative pressure chamber 28 and the variable pressure chamber 64 is no longer increased whereby the limit of the assistance made by the vacuum booster 22 is reached. However, there is a case in which, in the process of change of the variable-pressure chamber pressure toward the atmospheric pressure as a result of inflow of the atmosphere into the variable pressure chamber 64, the pressure difference between the negative pressure chamber 28 and the variable pressure chamber 64 is not increased but reduced whereby the boosting effect provided by the vacuum booster 22 is reduced.

Described in detail, the diaphragm 62 of the vacuum booster 22 is moved, by the braking operation, toward the negative pressure chamber 28, so that the volume of the negative pressure chamber 28 is reduced while the volume of the variable pressure chamber 64 is increased. In this instance, if there were no inflow of the atmosphere into the variable pressure chamber 64 as a result of the braking operation, the variable-pressure chamber pressure would be reduced due to increase of the volume of the variable pressure chamber 64. Actually, as a result of the braking operation with depression of the brake pedal 20, the atmosphere is caused to flow into the variable pressure chamber 64 whereby the variable-pressure chamber pressure is increased. The velocity or rate of increase of the variable-pressure chamber pressure owing to the inflow of the atmosphere into the variable pressure chamber 64 is, normally, higher than the velocity or rate of reduction of the variable-pressure chamber pressure owing to increase of the volume of the variable pressure chamber 64, so that the variable-pressure chamber pressure continues to be increased without being reduced until the variable-pressure chamber pressure becomes equal to the atmospheric pressure. However, there is a limit on a velocity or rate of the inflow of the atmosphere into the variable pressure chamber 64, since the atmosphere has to pass through a relatively narrow clearance and the filter 176, as indicated by arrow in FIG. 5B, so as to be introduced into the variable pressure chamber 64. Therefore, when the rate of increase of the volume of the variable pressure chamber 64 is made considerably high, for example, in the event of an abrupt braking operation, there is a case in which the rate of reduction of the variable-pressure chamber pressure owing to increase of the volume of the variable pressure chamber 64 is made higher than the rate of increase of the variable-pressure chamber pressure owing to the inflow of the atmosphere into the variable pressure chamber 64. In such a case, the variable-pressure chamber pressure is reduced in process of change of the variable-pressure chamber pressure toward the atmospheric pressure as a result of inflow of the atmosphere into the variable-pressure chamber.

On the other hand, when the volume of the negative pressure chamber 28 is reduced by execution of the braking operation, there is a case in which the negative-pressure chamber pressure (i.e., the air pressure of the negative pressure chamber 28) is increased. The negative pressure chamber 28 is connected to the intake manifold 34 via the negative-pressure supply conduit 32 in which the check valve 50 is disposed. Thus, since the air is allowed to flow from the negative pressure chamber 28 toward the intake manifold 34 so that, normally, the negative-pressure chamber pressure is not so changed even when the volume of the negative pressure chamber 28 is reduced. However, since the air flows from the negative pressure chamber 28 toward the intake manifold 34 via the negative-pressure supply conduit 32 and the check valve 50, there is a limit on a velocity or rate of the outflow of the air from the negative pressure chamber 28. Thus, when the rate of reduction of the volume of the negative pressure chamber 28 is made high, for example, in the event of an abrupt braking operation, there is a case in which the negative-pressure chamber pressure is increased.

Figure 8A:
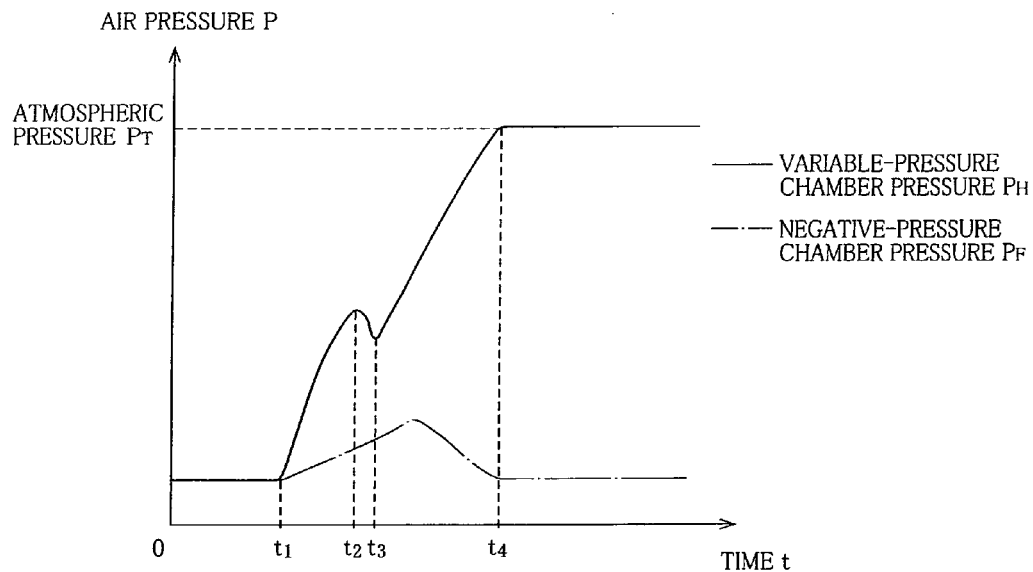
FIG. 8 is a set of graphs showing changes of an air pressure of the variable pressure chamber, an air pressure of the negative pressure chamber and the master cylinder pressure, with respect to elapse of time.
Figure 8B:
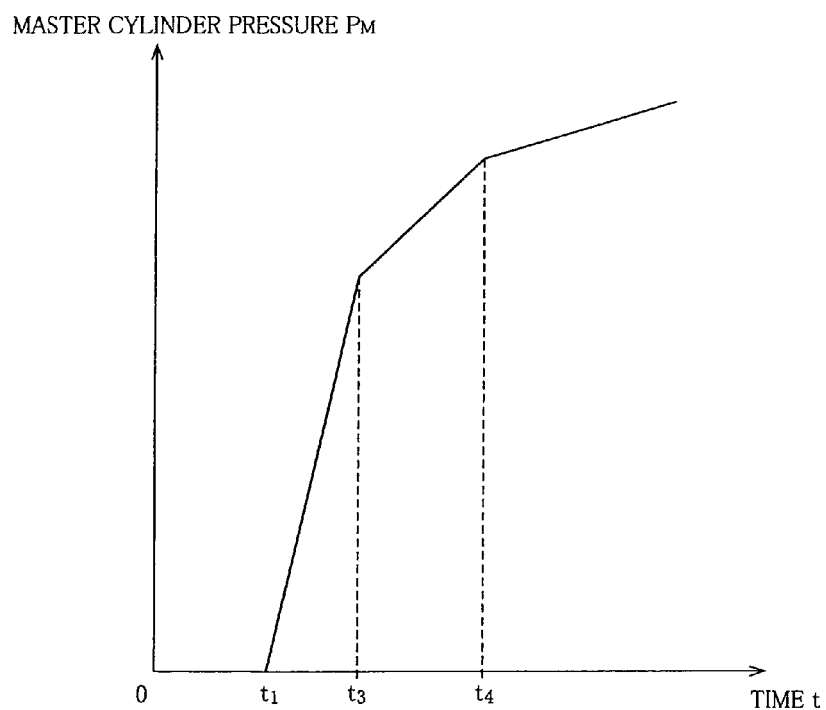

FIG. 8 is a set of graphs (a), (b) showing changes of the variable-pressure chamber pressure $P_H$, the negative-pressure chamber pressure $P_F$ and the master cylinder pressure $P_M$, in the event of an abrupt braking operation, with respect to elapse of time t that is represented by horizontal axes of the graphs (a), (b). The variable-pressure chamber pressure $P_H$ and the negative-pressure chamber pressure $P_F$ are represented by solid line and one-dot chain line, respectively, in the graph (a), while the master cylinder pressure $P_M$, is represented by solid line in the graph (b). At a point of time $t_1$ of start of the braking operation, the negative pressure chamber 28 and the variable pressure chamber 64 are in communication with each other so that the variable-pressure chamber pressure $P_H$ and the negative-pressure chamber pressure $P_F$ are equal to each other. After the point of time $t_1$, the variable-pressure chamber pressure $P_H$ is increased toward the atmospheric pressure $P_T$, owing to inflow of the atmosphere into the variable pressure chamber 64, as a result of start of the braking operation. In the process of increase of the variable-pressure chamber pressure $P_H$ toward the atmospheric pressure $P_T$, the variable-pressure chamber pressure $P_H$ begins to be reduced at a point $t_2$ of time, and is most reduced at a point of time $t_3$ of time. That is, it is considered that, from the point $t_2$ of time to the point $t_3$ of time, the rate of reduction of the variable-pressure chamber pressure owing to increase of the volume of the variable pressure chamber 64 is made higher than the rate of increase of the variable-pressure chamber pressure owing to inflow of the atmosphere into the variable pressure chamber 64, so that the variable-pressure chamber pressure $P_H$ is reduced. Then, the variable-pressure chamber pressure $P_H$ is increased again after the point $t_3$ of time, and the variable-pressure chamber pressure $P_H$ becomes equal to the atmospheric pressure $P_T$ at a point $t_4$ of time. Meanwhile, the negative-pressure chamber pressure $P_F$ is increased with reduction of the volume of the negative pressure chamber 28, and is reduced by the flow of the air from the negative pressure chamber 28 toward the intake manifold 34.

As is understood from FIG. 8, from the point $t_1$ of time to the point $t_2$ of time, the variable-pressure chamber pressure $P_H$ is drastically increased whereby the difference between the variable-pressure chamber pressure $P_H$ and the negative-pressure chamber pressure $P_F$ is increased. Then, from the point $t_2$ of time to the point $t_3$ of time, the variable-pressure chamber pressure $P_H$ is reduced while the negative-pressure chamber pressure $P_F$ is increased whereby the difference between the variable-pressure chamber pressure $P_H$ and the negative-pressure chamber pressure $P_F$ is reduced. Particularly, at the point $t_3$ of time at which the variable-pressure chamber pressure $P_H$ is most reduced, the difference between the variable-pressure chamber pressure $P_H$ and the negative-pressure chamber pressure $P_F$ is made considerably small. Therefore, the rate of increase of the master cylinder pressure $P_M$ after the point $t_3$ of time is made smaller than the rate of increase of the master cylinder pressure $P_M$ from the point $t_1$ of time to the point $t_3$ of time. That is, before the variable-pressure chamber pressure $P_H$ becomes equal to the atmospheric pressure, the boosting effect provided by the vacuum booster is reduced at the point $t_3$ of time. It is noted that the rate of increase of the master cylinder pressure $P_M$ from the point $t_3$ of time to the point $t_4$ of time is slightly higher than the rate of increase of the master cylinder pressure $P_M$ after the point $t_4$ of time. This is because, even after the boosting effect has been reduced at the point $t_3$ of time, the difference between the variable-pressure chamber pressure $P_H$ and the negative-pressure chamber pressure $P_F$ is increased by a certain degree until the variable-pressure chamber pressure $P_H$ becomes equal to the atmospheric pressure at the point $t_4$ of time.

In view of the fact described above, in the vehicle brake system 10, it is regarded that the assistance limit is reached at a point of time at which the variable-pressure chamber pressure is most reduced upon temporary reduction of the variable-pressure chamber pressure in the process of change (i.e., increase) of the variable-pressure chamber pressure toward the atmospheric pressure, which change accompanies the brake operation. That is, in the vehicle brake system 10, it is regarded that the assistance limit is reached at the point of time at which the variable-pressure chamber pressure is most reduced upon the temporary reduction, rather than at the point of time at which the variable-pressure chamber pressure becomes equal to the atmospheric pressure, and the brake-performance-property control begins to be executed at the point of time at which the variable-pressure chamber pressure is most reduced upon the temporary reduction. The brake-performance-property control is executed substantially in the same manner as the brake-performance-property control that begins to be executed at the point of time at which the variable-pressure chamber pressure becomes equal to the atmospheric pressure. In other words, the brake-performance-property control, which begins to be executed at the point of time at which the variable-pressure chamber pressure is most reduced, and the brake-performance-property control, which begins to be executed at the point of time at which the variable-pressure chamber pressure becomes equal to the atmospheric pressure, are executed substantially in the same manner, although they begin to be executed upon satisfaction of respective conditions that are different from each other. Therefore, in the following descriptions regarding the brake-performance-property control that begins to be executed upon the reduction of the variable-pressure chamber pressure, a part or parts of the control which are the same as the control that begins to be executed upon equalization of the variable-pressure chamber pressure with the atmospheric pressure, will be described in a simplified manner or will not be described.

Figure 9:
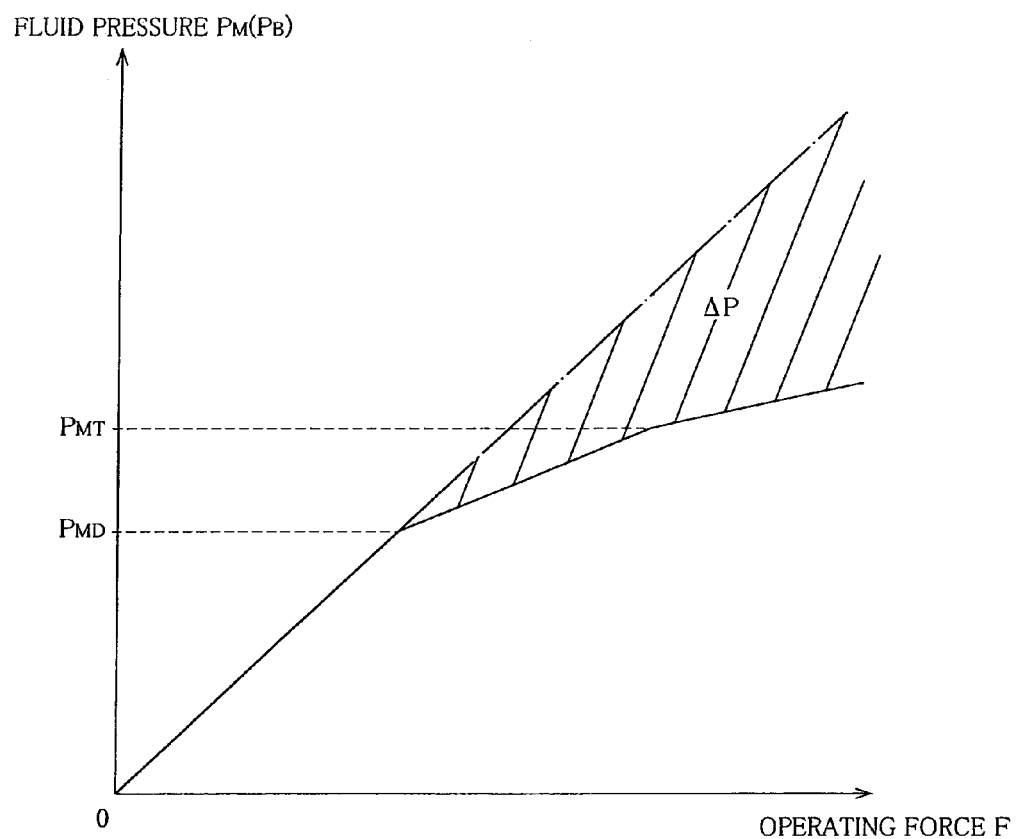
FIG. 9 is a graph showing a relationship between the operating force and the master cylinder pressure (brake cylinder pressure) in the event of an abrupt braking operation.

A relationship between the master cylinder pressure $P_M$ and the operating force (depressing force) F applied by the vehicle operator upon reduction of the variable-pressure chamber pressure in the process of change of the variable-pressure chamber pressure toward the atmospheric pressure which change accompanies the braking operation, is represented by a solid line in the graph of FIG. 9. A value of the master cylinder pressure at a point of time when the variable-pressure chamber pressure reaches the atmospheric pressure, is indicated by $P_{MT}$ in the graph of FIG. 9. A value of the master cylinder pressure at a point of time when the variable-pressure chamber pressure is most reduced upon the temporary reduction of the variable-pressure chamber pressure, is indicated by $P_{MD}$ in the graph of FIG. 9. In this control, too, as in the above-described control that begins to be executed upon equalization of the variable-pressure chamber pressure with the atmospheric pressure, the amount of electric current to be supplied to the solenoid 134 of the pressure control valve 120 is controlled in a manner that causes the pressure difference $\Delta P$ between the brake cylinder pressure $P_B$ and the master cylinder pressure $P_M$ to be substantially equal to an amount corresponding to a hatched region in the graph of FIG. 9 for thereby causing the brake cylinder pressure $P_B$ to be changed as indicated by one-dot chain line in the graph of FIG. 9.

Figure 10:
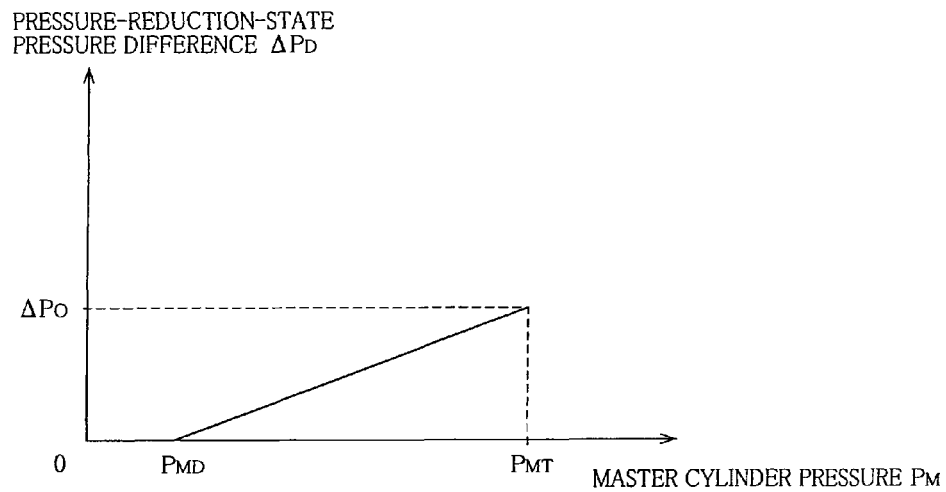
FIG. 10 is a graph showing a relationship between the master cylinder pressure and a pressure-reduction-state pressure difference.

Described specifically, the computer of the controller 182 stores therein a map data, as shown in a graph of FIG. 10, which relates to the pressure difference $\Delta P$ that is dependent on a parameter in the form of the master cylinder pressure $P_M$, i.e., a map data which relates to the pressure difference (hereinafter referred to as "pressure-reduction-state pressure difference" where appropriate) $\Delta P_D$ that is to be established upon the reduction of the variable-pressure chamber pressure. Thus, a target value of the pressure-reduction-state pressure difference $\Delta P_D$ is determined with reference to the stored data map as a predetermined rule, in a stage from a point of time at which the variable-pressure chamber pressure is most reduced to a point of time at which the variable-pressure chamber pressure becomes equal to the atmospheric pressure, i.e., in a stage when the master cylinder pressure $P_M$ is not lower than the value $P_{MD}$ and is lower than the value $P_{MT}$. It is noted that reference sign $\Delta P_O$ in the graph of FIG. 10 represents a value of the pressure difference $\Delta P$ that is to be established when the variable-pressure chamber pressure becomes equal to the atmospheric pressure. Then, after the variable-pressure chamber pressure has become equal to the atmospheric pressure, namely, when the master cylinder pressure $P_M$ becomes equal to or higher than the above-described value $P_{MT}$, a target value of the atmospheric-pressure-state pressure difference $\Delta P_T$ is determined with reference to the map data of FIG. 7. The determined target value of the atmospheric-pressure-state pressure difference $\Delta P_T$ is added to the target value of the pressure-reduction-state pressure difference $\Delta P_D$, and a sum of the target values of the atmospheric-pressure-state pressure difference $\Delta P_T$ and the pressure-reduction-state pressure difference $\Delta P_D$ are obtained as a target value of the pressure difference $\Delta P$.

Figure 11:
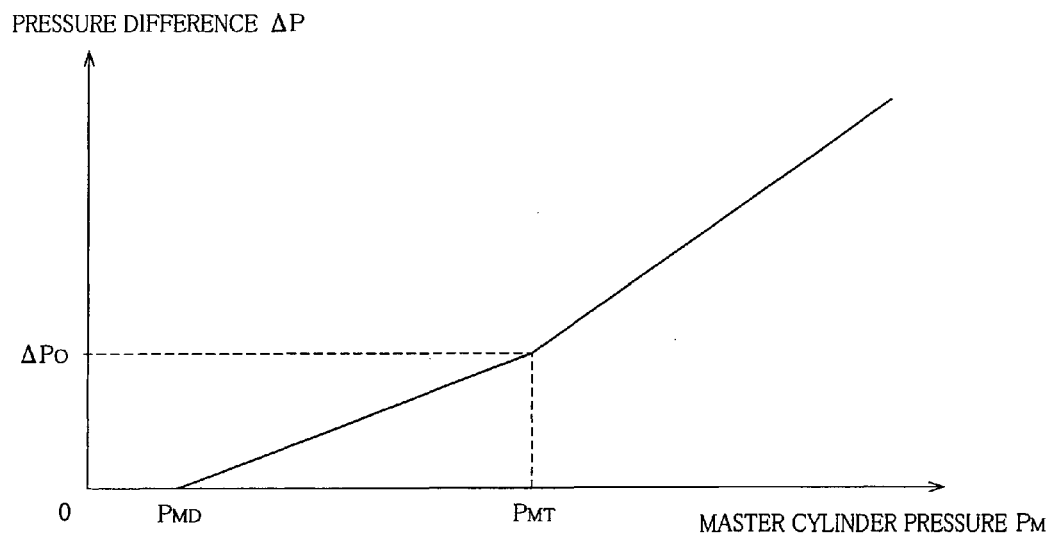
FIG. 11 is a graph showing a relationship between the master cylinder pressure and the pressure difference.

FIG. 11 is a graph showing a relationship between the master cylinder pressure $P_M$ and the pressure difference $\Delta P$ in the brake-performance-property control that begins to be executed upon the temporary reduction of the variable-pressure chamber pressure. In a stage when the master cylinder pressure $P_M$ is not lower than the value $P_{MD}$ and is lower than the value $P_{MT}$, namely, in a stage from a point of time at which the variable-pressure chamber pressure is most reduced to a point of time at which the variable-pressure chamber pressure becomes equal to the atmospheric pressure, the target value of the pressure difference $\Delta P$ is determined in accordance with the map data shown in FIG. 10. In a stage when the master cylinder pressure $P_M$ is not lower than the value $P_{MT}$, namely, in a stage after the variable-pressure chamber pressure has become equal to the atmospheric pressure, the target value of the pressure difference $\Delta P$ is determined in accordance with the map data shown in FIG. 7. As is understood from the graph of FIG. 11, a rate (i.e., gradient) of increase of the pressure difference ΔP after the variable-pressure chamber pressure has become equal to the atmospheric pressure is higher than the rate of increase of the pressure difference ΔP before the variable-pressure chamber pressure becomes equal to the atmospheric pressure. By determining the pressure difference ΔP in this way, it is possible to change the brake cylinder pressure $P_B$ as indicated by one-dot chain line in FIG. 9, so that the brake performance can be kept constant in the brake-performance-property control that begins to be executed upon the temporary reduction of the variable-pressure chamber pressure.

There is a case where the variable-pressure chamber pressure is reduced due to the assistance limit, as described above. Further, there is also a case where the variable-pressure chamber pressure is reduced depending on a manner in which the brake pedal 20 is operated by the vehicle operator. Specifically described, the variable-pressure chamber pressure could be reduced, for example, when the brake pedal 20 is temporarily released and then depressed again by the vehicle operator in a braking operation. In such a case, the variable pressure chamber pressure could be reduced since the variable pressure chamber is brought into communication with the negative pressure chamber. In view of this, in the vehicle brake system 10, the brake-performance-property control, which is to begin to be executed upon the temporary reduction of the variable-pressure chamber pressure, is inhibited from being executed when there is a risk of reduction of the variable-pressure chamber pressure due to a factor that is other than the assistance limit Described in detail, when an amount of operation of the brake pedal 20 is reduced, there is a risk of reduction of the variable-pressure chamber pressure due to a factor that is other than the assistance limit, so that the brake-performance-property control, which is to begin to be executed upon the temporary reduction of the variable-pressure chamber pressure, is inhibited from being executed. Described specifically, since it is considered that the amount of operation of the brake pedal 20 is increased when the rate of change of the master cylinder pressure PM is higher than 0, the brake-performance-property control, which is to begin to be executed upon the temporary reduction of the variable-pressure chamber pressure, is inhibited from being executed when the rate of change of the master cylinder pressure PM is not higher than a predetermined negative value as a threshold value, namely, when the master cylinder pressure PM is reduced at a rate higher than a threshold rate.

<Control Programs>

Figure 12:
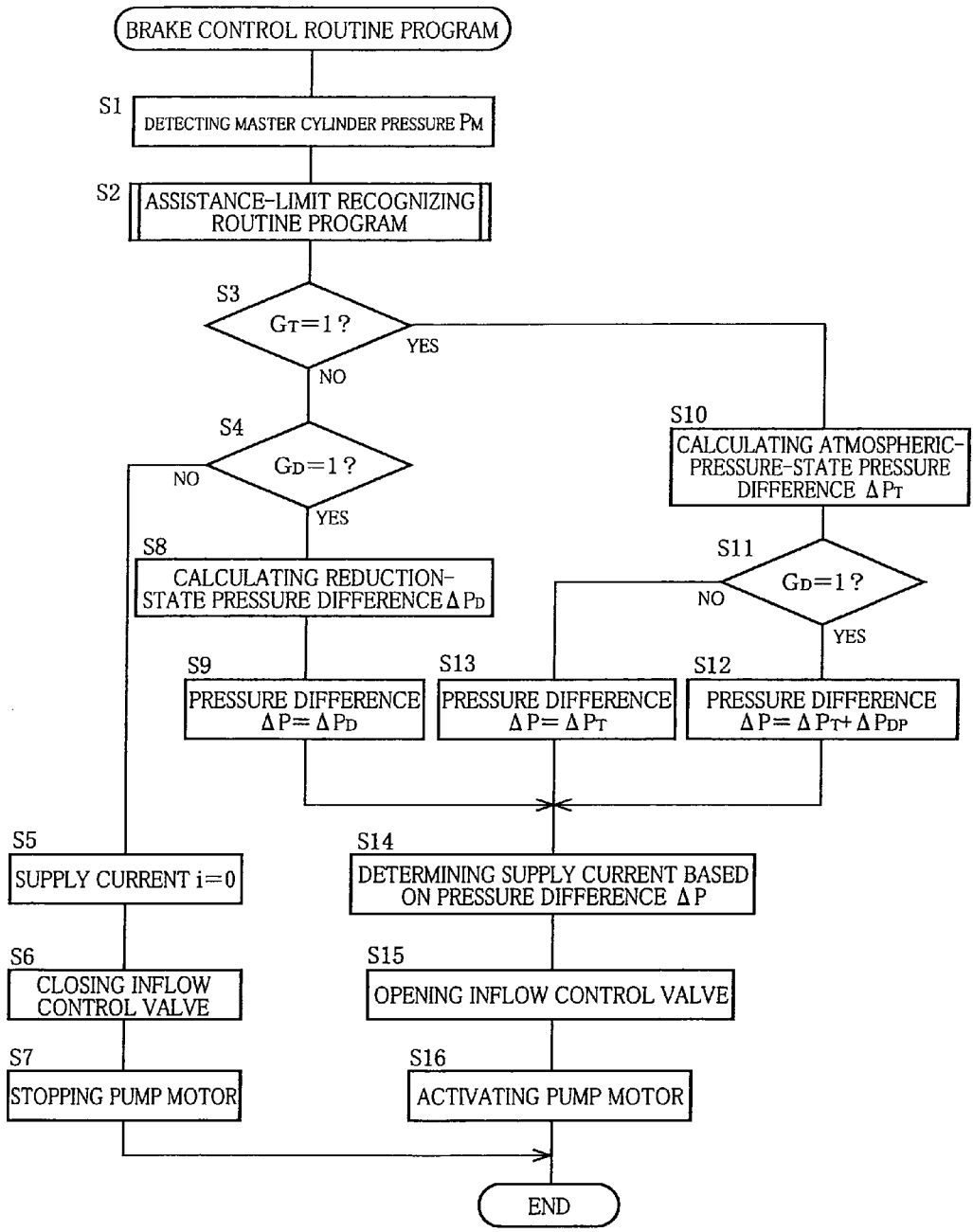
FIG. 12 is a flow chart showing a brake control routine program.

In the vehicle brake system 10, the brake-performance-property control, which is be executed upon the assistance limit of the vacuum booster 20, is executed by carrying out a brake control routine program by the controller 182 at a short time interval (e.g., several tens of milliseconds) while an ignition switch of the vehicle is placed in its ON state. The brake control routine program will be described with reference to a flow chart of FIG. 12.

Figure 13:
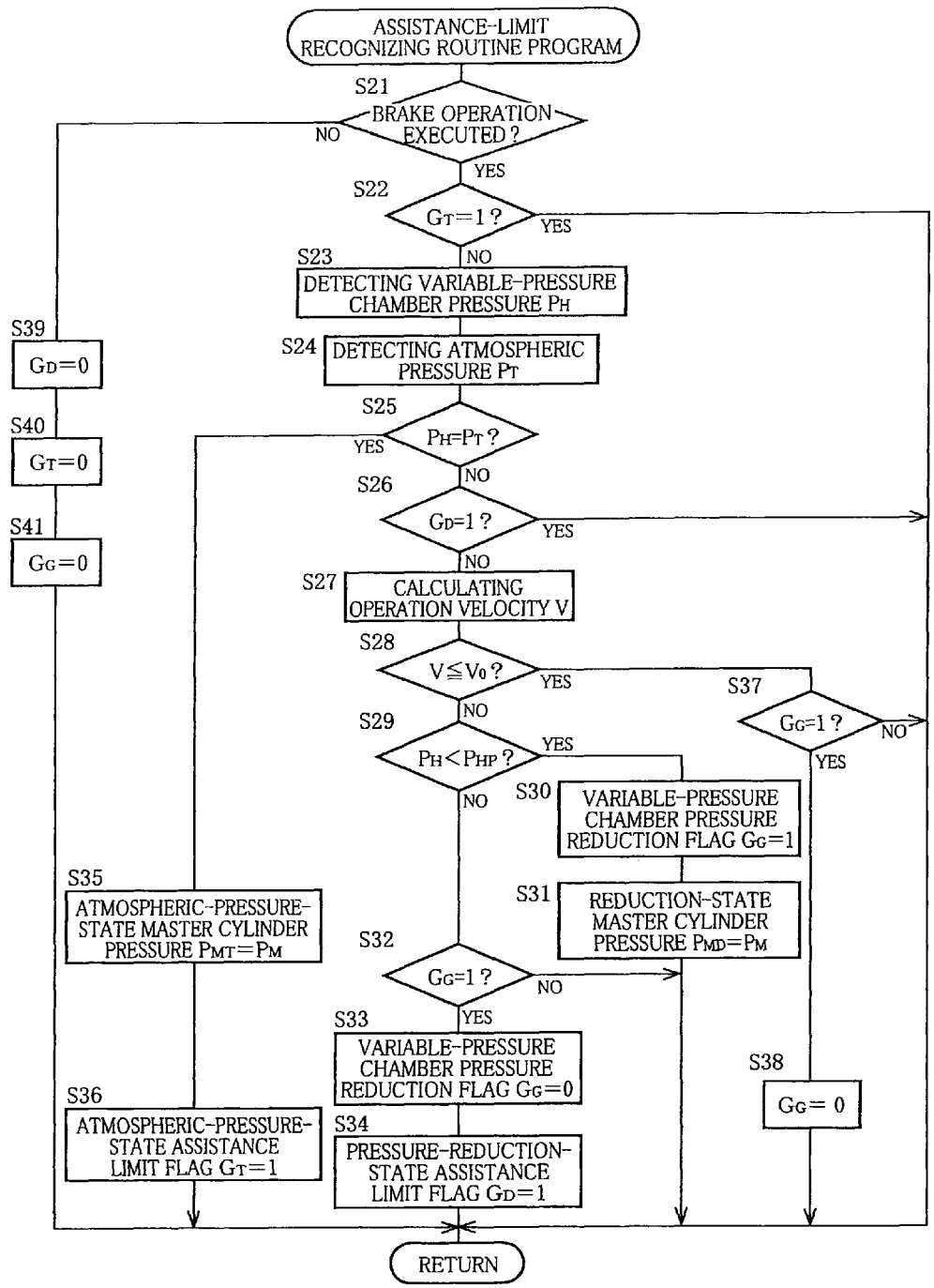
FIG. 13 is an assistance-limit recognizing routine program as a sub-routine program of the brake control routine program of FIG. 12.

The brake control routine program is initiated with step S1 in which the master cylinder pressure $P_M$ is detected by the fluid-pressure sensor 200. Step S1 is followed by step S2, which is implemented by carrying out an assistance-limit recognizing routine program as a sub-routine program of the brake control routine program, for recognizing the assistance limit of the vacuum booster 22. As shown in FIG. 13 in which the assistance-limit recognizing routine program is represented by a flow chart, this sub-routine program is initiated with step S21 that is implemented to judge whether the brake operation is being executed or not. This judgment is made by checking if the mater cylinder pressure $P_M$ exceeds a threshold value or not. When it is judged that the master cylinder pressure $P_M$ exceeds the threshold value, namely, when it is judged that the braking operation is being executed, step S22 is implemented to judge whether an atmospheric-pressure-state assistance limit flag $G_T$ is being set in 1 (one). This flag $G_T$ is a flag indicating whether the limit of the assistance by the vacuum booster has been reached due to equalization of the variable-pressure chamber pressure $P_H$ with the atmospheric pressure $P_T$. When the flag $G_T$ is being set in 1, it indicates that the assistance limit has been reached due to equalization of the variable-pressure chamber pressure $P_H$ with the atmospheric pressure $P_T$. When the flag $G_T$ is being set in 0, it indicates that the assistance limit has not been reached due to equalization of the variable-pressure chamber pressure $P_H$ with the atmospheric pressure $P_T$.

When it is judged that the atmospheric-pressure-state assistance limit flag $G_T$ is being set in 0 (zero), step S22 is followed by steps S23 and S24. In step S23, the variable-pressure chamber pressure $P_H$ is detected by the pressure sensor 178. In step S24, the atmospheric pressure $P_T$ is detected by the atmospheric pressure sensor 202. In step S25, it is judged whether the variable-pressure chamber pressure $P_H$ is equal to the atmospheric pressure $P_T$. When it is judged in step S25 that the variable-pressure chamber pressure $P_H$ is not equal to the atmospheric pressure $P_T$, step S26 is implemented to judge whether a pressure-reduction-state assistance limit flag $G_D$ is being set in 1. This flag $G_D$ is a flag indicating whether it is regarded that the assistance limit has bee reached due to reduction of the variable-pressure chamber pressure $P_H$ during the braking operation. When the flag $G_D$ is being set in 1, it indicates that the assistance limit has been reached due to the reduction of the variable-pressure chamber pressure $P_H$. When the flag $G_T$ is being set in 0, it indicates that it is not regarded that the assistance limit has been reached due to the reduction of the variable-pressure chamber pressure $P_H$.

When it is judged that the pressure-reduction-state assistance limit flag $G_D$ is being set in 0 (zero), step S26 is followed by steps S27 and S28. In step S27, a velocity V of change of the master cylinder pressure $P_M$ is calculated. In step S28, it is judged whether the calculated velocity V of change of the master cylinder pressure $P_M$ is equal to or lower than a threshold value $V_0$. When it is judged that the change velocity V is higher than the threshold value $V_0$, step S29 is implemented to judge whether the variable-pressure chamber pressure $P_H$ is being reduced or not. Specifically described, this judgment is made by checking if the variable-pressure chamber pressure $P_H$ detected in step S23 in current execution of the assistance-limit recognizing routine program is lower than the variable-pressure chamber pressure $P_{HP}$ detected in step S23 in previous cycle of execution of the assistance-limit recognizing routine program. When it is judged that the current variable-pressure chamber pressure $P_H$ is lower than the previous variable-pressure chamber pressure $P_{HP}$, namely, when it is judged that the variable-pressure chamber pressure $P_H$ is being reduced, step S30 is implemented whereby a variable-pressure chamber pressure reduction flag $G_G$ is set to 1. This flag $G_G$ is a flag indicating whether the variable-pressure chamber pressure $P_H$ is being reduced or not. When the flag $G_G$ is being set in 1, it indicates that the variable-pressure chamber pressure $P_H$ is being reduced. When the flag $G_G$ is being set in 0, it indicates that the variable-pressure chamber pressure $P_H$ is not being reduced. Then, in step S31, a reduction-state master cylinder pressure $P_{MD}$, which is the master cylinder pressure when the variable-pressure chamber pressure $P_H$ is most reduced upon the temporary reduction of the variable-pressure chamber, is set as the master cylinder pressure $P_M$ detected in current cycle of execution of the assistance-limit recognizing routine program.

When it is judged in step S29 that the variable-pressure chamber pressure $P_H$ is not being reduced, step S32 is implemented to judge whether the variable-pressure chamber pressure reduction flag $G_G$ is being set in 1. When it is judged that this flag $G_G$ is being set in 1, step S32 is followed by steps S33 and S34. In step S33, the flag $G_G$ is set to 0. In step S34, the pressure-reduction-state assistance limit flag $G_D$ is set to 1. When it is judged in step S25 that the variable-pressure chamber pressure $P_H$ is equal to the atmospheric pressure $P_T$, step S35 is implemented whereby an atmospheric-pressure-state master cylinder pressure $P_{MT}$, which is the master cylinder pressure when the variable-pressure chamber pressure $P_H$ is equal to the atmospheric pressure $P_T$, is set as the as the master cylinder pressure $P_M$ detected in current cycle of execution of the assistance-limit recognizing routine program Step S35 is followed by step S36 in which the atmospheric-pressure-state assistance limit flag $G_T$ is set to 1.

When it is judged in step S28 that the change velocity V of the master cylinder pressure $P_M$ is not higher than the threshold value $V_0$, step S37 is implemented to judge whether the variable-pressure chamber pressure reduction flag $G_G$ is being set in 1. When it is judged that this flag $G_G$ is being set in 1, step S38 is implemented whereby the flag $G_G$ is set to 0. Further, when it is judged in step S21 that the braking operation is not being carried out, steps S39-S41 are implemented whereby each of the pressure-reduction-state assistance limit flag $G_D$, atmospheric-pressure-state assistance limit flag $G_T$ and variable-pressure chamber pressure reduction flag $G_G$ is set to 0. One cycle of execution of the assistance-limit recognizing routine program as the sub-routine program of the brake control routine program is completed with determinations of the flags $G_D$, $G_T$, $G_G$. By execution of this assistance-limit recognizing routine program, it is possible to recognize the limit of the assistance made by the vacuum booster and to carry out an assistance-limit recognizing method upon reduction of the variable-pressure chamber pressure during the braking operation.

After one cycle of execution of the assistance-limit recognizing routine program, step S3 is implemented to judge whether the atmospheric-pressure-state assistance limit flag $G_T$ is being set in 1. When it is judged that the flag $G_T$ is being set in 0, step S4 is implemented to judge whether the pressure-reduction-state assistance limit flag $G_D$ is being set in 1. When it is judged that the flag $G_D$ is being set in 0, step S5 is implemented whereby an electric current i that is to be supplied to the solenoid 134 of the pressure control valve 120 is set to 0, and an electric current control signal based on the electric current i that has been set to 0 is transmitted to the drive circuit 192, for thereby generating a brake force based on the operating force applied by the vehicle operator and the assisting force generated by the vacuum booster 22. Step S5 is followed by steps S6 and S7. In step S6, a control signal for causing the inflow control valve 150 to be closed is transmitted to the drive circuit 194. In step S7, a control signal for causing the pump motor 184 to be stopped (i.e., inactivated) is transmitted to the drive circuit 186.

Further, when it is judged in step S4 that the pressure-reduction-state assistance limit flag $G_D$ is set in 1, step S8 is implemented to calculate the target value of the pressure-reduction-state pressure difference $\Delta P_D$ on the basis of the reduction-state master cylinder pressure $P_{MD}$ and the master cylinder pressure $P_M$ with reference to the map data as shown in FIG. 10. Then, step S9 is implemented whereby the pressure difference $\Delta P$, which is to be used in the brake-performance-property control, is set to the calculated target value of the pressure-reduction-state pressure difference $\Delta P_D$. Further, when it is judged in step S3 that the atmospheric-pressure-state assistance limit flag $G_T$ is being set in 1, step S10 is implemented to calculate the target value of the atmospheric-pressure-state pressure difference $\Delta P_T$ on the basis of the atmospheric-pressure-state master cylinder pressure $P_{MT}$ and the master cylinder pressure $P_M$ with reference to the map data as shown in FIG. 7. Then, step S11 is implemented to judge whether the pressure-reduction-state assistance limit flag $G_D$ is being set in 1. When it is judged that the flag $G_D$ is being set in 1, step S12 is implemented whereby the pressure difference $\Delta P$, which is to be used in the brake-performance-property control, is set to a sum of the calculated atmospheric-pressure-state pressure difference $\Delta P_T$ and the previous pressure-reduction-state pressure difference $\Delta P_{DP}$ which has been used previous cycle of execution of the assistance-limit recognizing routine program. It is noted that the previous pressure-reduction-state pressure difference $\Delta P_{DP}$ corresponds to the value $\Delta P_0$ in the graph of FIG. 10. When it is judged in step S11 that the pressure-reduction-state assistance limit flag $G_D$ is being set in 0, step S13 is implemented whereby the pressure difference $\Delta P$, which is to be used in the brake-performance-property control, is set to the calculated atmospheric-pressure-state pressure difference $\Delta P_T$.

After determination of the pressure difference $\Delta P$ that is to be used in the brake-performance-property control, steps S14-S16 are implemented for carrying out the brake-performance-property control. In step S14, the electric current i, which is to be supplied to the solenoid 134 of the pressure control valve 120, is determined on the basis of the determined pressure difference $\Delta P$, and an electric current control signal based on the determined electric current i is supplied to the drive circuit 192. In step S15, a control signal causing the inflow control valve 150 to be opened is transmitted to the drive circuit 194. In step S16, a control signal causing the pump motor 184 to be activated is transmitted to the drive circuit 186. One cycle of execution of the brake control routine program is completed with implementation of step S16 or step S7.

<Functional Construction of Controller>

It can be considered that the controller 182 configured to execute the above-described brake control routine program has functional construction as shown in FIG. 14, in view of procedures carried out by execution of the brake control routine program. As is understood from FIG. 14, the controller 182 has a brake-performance-property control executing portion 210 as a functional portion configured to implement steps S8-S16, namely, as a functional portion configured to execute the brake-performance-property control, and has also an assistance-limit recognizing portion 212 as a functional portion configured to implement steps S21-S37, namely, as a functional portion configured to recognize the limit of the assistance made by the vacuum booster 22. It is noted that the assistance-limit recognizing portion 212 serves as an assistance-limit recognizing device configured to recognize the assistance limit.

The brake-performance-property control executing portion 210 has a pressure-difference determining portion 216 as a functional portion configured to implement steps S8-S13, namely, as a functional portion configured to determine the pressure difference $\Delta P$ that is to be established between the master cylinder pressure $P_M$ and the brake cylinder pressure $P_B$, and has also a pressure-difference generating portion 218 as a functional portion configured to implement steps S14-S16, namely, as a functional portion configured to establish the determined pressure difference $\Delta P$ between the master cylinder pressure $P_M$ and the brake cylinder pressure $P_B$.

Further, the assistance-limit recognizing portion 212 has an atmospheric-pressure-basis assistance-limit recognizing portion 220 as a functional portion configured to implement steps S23-S25, namely, as a functional portion configured to recognize the assistance limit on the basis of a fact that the variable-pressure chamber pressure $P_H$ has become equal to the atmospheric pressure $P_T$, and has also a pressure-reduction-basis assistance-limit recognizing portion 222 as a functional portion configured to implement steps S27-S32, namely, as a functional portion configured to recognize the assistance limit on the basis of a fact that the variable-pressure chamber pressure $P_H$ has been reduced.

The invention claimed is:

1. An assistance-limit recognizing device for recognizing a limit of assistance made by a vacuum booster that is configured to assist an operating force applied to a brake operating member of a vehicle from an operator of the vehicle, the vacuum booster having a negative pressure chamber and a variable pressure chamber that is to be selectively brought into communication with the negative pressure chamber and an atmosphere, such that a communication between the variable pressure chamber and the negative pressure chamber is established, when the operating force is not being applied to the brake operating member from the operator, and such that a communication between the variable pressure chamber and the atmosphere is established while the communication between the variable pressure chamber and the negative pressure chamber is being cut off, when the operating force is being applied to the brake operating member, whereby the operating force applied to the brake operating member is assisted based on a pressure difference between a pressure in the negative pressure chamber and a pressure in the variable pressure chamber, said assistance-limit recognizing device being configured, upon reduction of the pressure in the variable pressure chamber in a process of change of the pressure in the variable pressure chamber increasing toward a pressure of the atmosphere with application of the operating force to the brake operating member, to recognize the limit of the assistance made by the vacuum booster.

2. The assistance-limit recognizing device according to claim 1, being configured to recognize the limit of the assistance made by the vacuum booster, at a point of time when the pressure in the variable pressure chamber is most reduced upon the reduction of the pressure in the variable pressure chamber in the process of change of the pressure in the variable pressure chamber toward the pressure of the atmosphere.

3. The assistance-limit recognizing device according to claim 1, wherein the vacuum booster includes a housing and a diaphragm which divides an inner space within the housing into the negative pressure chamber and the variable pressure chamber, and which is movable with the application of the operating force to the brake operating member, in a manner that causes reduction of a volume of the negative pressure chamber and increase of a volume of the variable pressure chamber.

4. The assistance-limit recognizing device according to claim 1, wherein the vacuum booster has: (i) an atmosphere inflow passage through which the variable pressure chamber is to be brought into communication with the atmosphere whereby an air is introduced into the variable pressure chamber via the atmosphere inflow passage; and (ii) a filter disposed in the atmosphere inflow passage.

5. The assistance-limit recognizing device according to claim 1, configured, when an amount of operation of the brake operating member is reduced, to abstain from recognizing the limit of the assistance, even upon the reduction of the pressure in the variable pressure chamber in the process of change of the pressure in the variable pressure chamber toward the pressure of the atmosphere.

6. The assistance-limit recognizing device according to claim 1, configured, when a velocity of operation of the brake operating member is not higher than a threshold velocity, to abstain from recognizing the limit of the assistance, even upon the reduction of the pressure in the variable pressure chamber in the process of change of the pressure in the variable pressure chamber toward the pressure of the atmosphere.

7. A vehicle brake system comprising:
said assistance-limit recognizing device recited in claim 1;
said brake operating member;
said vacuum booster;
a master cylinder configured to pressurize a working fluid, based on the operating force applied to said brake operating member and an assisting force generated by said vacuum booster;
a brake device configured to generate a brake force, based on the working fluid pressurized by said master cylinder;
a communication passage through which the working fluid is to flow between said brake device and said master cylinder;
a communication-state switching device disposed in said communication passage, and configured to switch a flowing state of the working fluid between a flow allowing state in which the working fluid is allowed to flow between said brake device and said master cylinder and a flow inhibiting state in which the working fluid is inhibited from flowing between said brake device and said master cylinder;
a working-fluid pressurizing device configured to pressurize the working fluid that is to act on said brake device such that the working fluid is pressurized in a portion of said communication passage which is located between said communication-state switching device and said brake device;
an adjusting device configured to adjust a pressure of the working fluid which is to act on said brake device;
a control device configured to control said communication-state switching device for thereby switching the flowing state of the working fluid, configured to control said working-fluid pressurizing device for thereby selectively activating and inactivating said working-fluid pressurizing device, and configured to control said adjusting device for thereby controlling a brake acting pressure which is the pressure of the working fluid that is to act on said brake device; and
said control device being configured, when the limit of the assistance made by said vacuum booster is recognized by said assistance-limit recognizing device, to control said communication-state switching device, said working-fluid pressurizing device and said adjusting device such that the flow of the working fluid between said brake device and said master cylinder is being inhibited and such that the brake acting pressure is higher than a master cylinder pressure which is the pressure of the working fluid which is pressurized by said master cylinder.

8. The vehicle brake system according to claim 7, wherein said control device is configured, when the limit of the assistance made by said vacuum booster is recognized by said assistance-limit recognizing device, to control said adjusting device such that a difference between the brake acting pressure and the master cylinder pressure, which is the pressure of the working fluid that is pressurized by said master cylinder in a state when the flow of the working fluid between said brake device and said master cylinder is being inhibited, is increased with increase of the master cylinder pressure.

9. The vehicle brake system according to claim 7, wherein said control device is configured, when the limit of the assistance made by said vacuum booster is recognized by said assistance-limit recognizing device, to control said adjusting device in accordance with a rule that is determined such that a difference between the brake acting pressure and the master cylinder pressure, which is the pressure of the working fluid that is pressurized by said master cylinder in a state when the flow of the working fluid between said brake device and said master cylinder is being inhibited, is increased with increase of the master cylinder pressure and such that a rate of increase of the difference after the pressure in said variable pressure chamber has become equal to the pressure of the atmosphere is higher than the rate of increase of the difference before the pressure in said variable pressure chamber becomes equal to the pressure of the atmosphere.

10. An assistance-limit recognizing method for recognizing a limit of assistance made by a vacuum booster that is configured to assist an operating force applied to a brake operating member of a vehicle from an operator of the vehicle, the vacuum booster having a negative pressure chamber and a variable pressure chamber that is to be selectively brought into communication with the negative pressure chamber and an atmosphere, such that a communication between the variable pressure chamber and the negative pressure chamber is established, when the operating force is not being applied to the brake operating member from the operator, and such that a communication between the variable pressure chamber and the atmosphere is established while the communication between the variable pressure chamber and the negative pressure chamber is being cut off, when the operating force is being applied to the brake operating member, whereby the operating force applied to the brake operating member is assisted based on a pressure difference between a pressure in the negative pressure chamber and a pressure in the variable pressure chamber, comprising:

recognizing the limit of the assistance made by the vacuum booster upon the reduction of the pressure in the variable pressure chamber in a process of change of the pressure in the variable pressure chamber increasing toward a pressure of the atmosphere with application of the operating force to the brake operating member.

11. An assistance-limit recognizing device for recognizing a limit of assistance made by a vacuum booster that is configured to assist an operating force applied to a brake operating member of a vehicle from an operator of the vehicle, the vacuum booster having a negative pressure chamber and a variable pressure chamber that is to be selectively brought into communication with the negative pressure chamber and an atmosphere, such that a communication between the variable pressure chamber and the negative pressure chamber is established, when the operating force is not being applied to the brake operating member from the operator, and such that a communication between the variable pressure chamber and the atmosphere is established while the communication between the variable pressure chamber and the negative pressure chamber is being cut off, when the operating force is being applied to the brake operating member, whereby the operating force applied to the brake operating member is assisted based on a pressure difference between a pressure in the negative pressure chamber and a pressure in the variable pressure chamber, said assistance-limit recognizing device being configured, upon reduction of the pressure in the variable pressure chamber in a process of change of the pressure in the variable pressure chamber toward a pressure of the atmosphere with application of the operating force to the brake operating member, to recognize the limit of the assistance made by the vacuum booster, said reduction being caused when a rate of reduction of the pressure in the variable pressure chamber by an increase in volume of the variable pressure chamber is higher than a rate of increase of the pressure in the variable pressure chamber by the variable pressure chamber communicating with the atmosphere in the process of the change of the pressure in the variable pressure chamber toward the pressure of the atmosphere.

12. The vehicle brake system according to claim 7, wherein said assistance-limit recognizing device is configured to recognize the limit of the assistance made by the vacuum booster upon said reduction of the pressure in the variable pressure chamber, said reduction being caused when a rate of reduction of the pressure in the variable pressure chamber by an increase in volume of the variable pressure chamber is higher than a rate of increase of the pressure in the variable pressure chamber by the variable pressure chamber communicating with the atmosphere in the process of the change of the pressure in the variable pressure chamber toward the pressure of the atmosphere.

13. An assistance-limit recognizing method for recognizing a limit of assistance made by a vacuum booster that is configured to assist an operating force applied to a brake operating member of a vehicle from an operator of the vehicle, the vacuum booster having a negative pressure chamber and a variable pressure chamber that is to be selectively brought into communication with the negative pressure chamber and an atmosphere, such that a communication between the variable pressure chamber and the negative pressure chamber is established, when the operating force is not being applied to the brake operating member from the operator, and such that a communication between the variable pressure chamber and the atmosphere is established while the communication between the variable pressure chamber and the negative pressure chamber is being cut off, when the operating force is being applied to the brake operating member, whereby the operating force applied to the brake operating member is assisted based on a pressure difference between a pressure in the negative pressure chamber and a pressure in the variable pressure chamber, comprising:

recognizing the limit of the assistance made by the vacuum booster upon the reduction of the pressure in the variable pressure chamber in a process of change of the pressure in the variable pressure chamber toward a pressure of the atmosphere with application of the operating force to the brake operating member, said reduction being caused when a rate of reduction of the pressure in the variable pressure chamber by an increase in volume of the variable pressure chamber is higher than a rate of increase of the pressure in the variable pressure chamber by the variable pressure chamber communicating with the atmosphere in the process of the change of the pressure in the variable pressure chamber toward the pressure of the atmosphere.

* * * * *